United States Patent
Oikawa

(10) Patent No.: US 7,664,502 B2
(45) Date of Patent: Feb. 16, 2010

(54) RADIO NETWORK CONTROLLER AND METHOD FOR HANDOVER OF MOBILE TERMINAL

(75) Inventor: Kouji Oikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 11/590,777

(22) Filed: Nov. 1, 2006

(65) Prior Publication Data

US 2008/0008146 A1 Jan. 10, 2008

(30) Foreign Application Priority Data

Jul. 10, 2006 (JP) ............................. 2006-189629

(51) Int. Cl.
*H04W 36/00* (2009.01)
(52) U.S. Cl. .................. 455/443; 455/560; 455/437; 455/438; 455/439; 455/440
(58) Field of Classification Search ................ 370/412, 370/392, 503, 328; 455/442; 710/3; 711/211; 345/564
See application file for complete search history.

(56) References Cited

U.S. PATENT DOCUMENTS

| 4,875,157 | A * | 10/1989 | Frimmel et al. | 711/211 |
|---|---|---|---|---|
| 5,828,659 | A * | 10/1998 | Teder et al. | 370/328 |
| 6,084,601 | A * | 7/2000 | Thayer | 345/564 |
| 6,298,073 | B1 * | 10/2001 | LeFever | 370/503 |
| 6,895,010 | B1 * | 5/2005 | Chang et al. | 370/394 |
| 6,990,535 | B1 * | 1/2006 | Yang et al. | 710/3 |
| 7,117,317 | B2 * | 10/2006 | Kanai | 711/154 |
| 7,126,957 | B1 * | 10/2006 | Isukapalli et al. | 370/412 |
| 7,359,623 | B2 * | 4/2008 | Murakami | 386/123 |
| 2004/0072567 | A1 * | 4/2004 | Cao et al. | 455/442 |
| 2006/0203821 | A1 * | 9/2006 | Mizusawa et al. | 370/392 |

FOREIGN PATENT DOCUMENTS

| CA | 2 384 688 A1 | 3/2001 |
|---|---|---|
| EP | 1643690 A1 | 4/2006 |
| JP | 2003-509973 | 3/2003 |
| WO | WO 2005/107090 A | 11/2005 |

OTHER PUBLICATIONS

Samsung Electronics: "3GPP TSG-RAN WG1 #31 Meeting: HARQ Structure" Feb. 21, 2003, 3GPP, Internet Publication XP002482879 Retrieved from the Internet: URL:http://www.3gpp.org/ftp/tsg_ran/WG1_RL1/TSGR1_31/Docs/Zips/ p. 3, paragraph 3.
Extended European Search Report corresponding to EP Application No. 06123398.7-2414 dated Jun. 20, 2008.

* cited by examiner

*Primary Examiner*—Rafael Pérez-Gutiérrez
*Assistant Examiner*—Nalin Pilapitiya
(74) *Attorney, Agent, or Firm*—Hanify & King, PC

(57) ABSTRACT

In a radio network controller (100), a buffer (161) for buffering data received from a mobile terminal (MT) via different base stations (BS1 and BSX) is expanded in accordance with the magnitude of the difference between the data transmission time from the base station (BS1) to the radio network controller (100) and the data transmission time from the base station (BSX) to the radio network controller (100).

16 Claims, 23 Drawing Sheets

FIG.7

| | | | | | |
|---|---|---|---|---|---|
| PATH D | DATA TRANSMISSION TIME | | | ... | |
| | DATA IDENTIFICATION NUMBER | | | ... | |
| PATH C | DATA TRANSMISSION TIME | | | ... | |
| | DATA IDENTIFICATION NUMBER | | | ... | |
| PATH B | DATA TRANSMISSION TIME | □□ms | | ... | |
| | DATA IDENTIFICATION NUMBER | 876×× | | ... | |
| PATH A | DATA TRANSMISSION TIME | △△ms | ▽▽ms | ... | |
| | DATA IDENTIFICATION NUMBER | 987××× | 765××× | ... | |
| | TERMINAL IDENTIFICATION NUMBER | 123○○○ | 234○○○ | ... | |

| TERMINAL IDENTIFICATION NUMBER | BUFFERING PERIOD |
|---|---|
| 123○○○ | ○○○○ms |
| 234○○○ | ××××ms |
| ⋮ | ⋮ |
| | |

FIG. 16

CONTROL FLAG TABLE 163

| TERMINAL IDENTIFICATION NUMBER | ExV (EXPANSION BUFFER NEEDED OR NOT NEEDED) | ExDV (PRESENCE OR ABSENCE OF VALID DATA IN EXPANSION BUFFER) | ExAdr (STARTING ADDRESS OF EXPANSION BUFFER) | FrNH |
|---|---|---|---|---|
| 123○○○ | | | | |
| 234○○○ | | | | |
| ... | ... | ... | ... | ... |

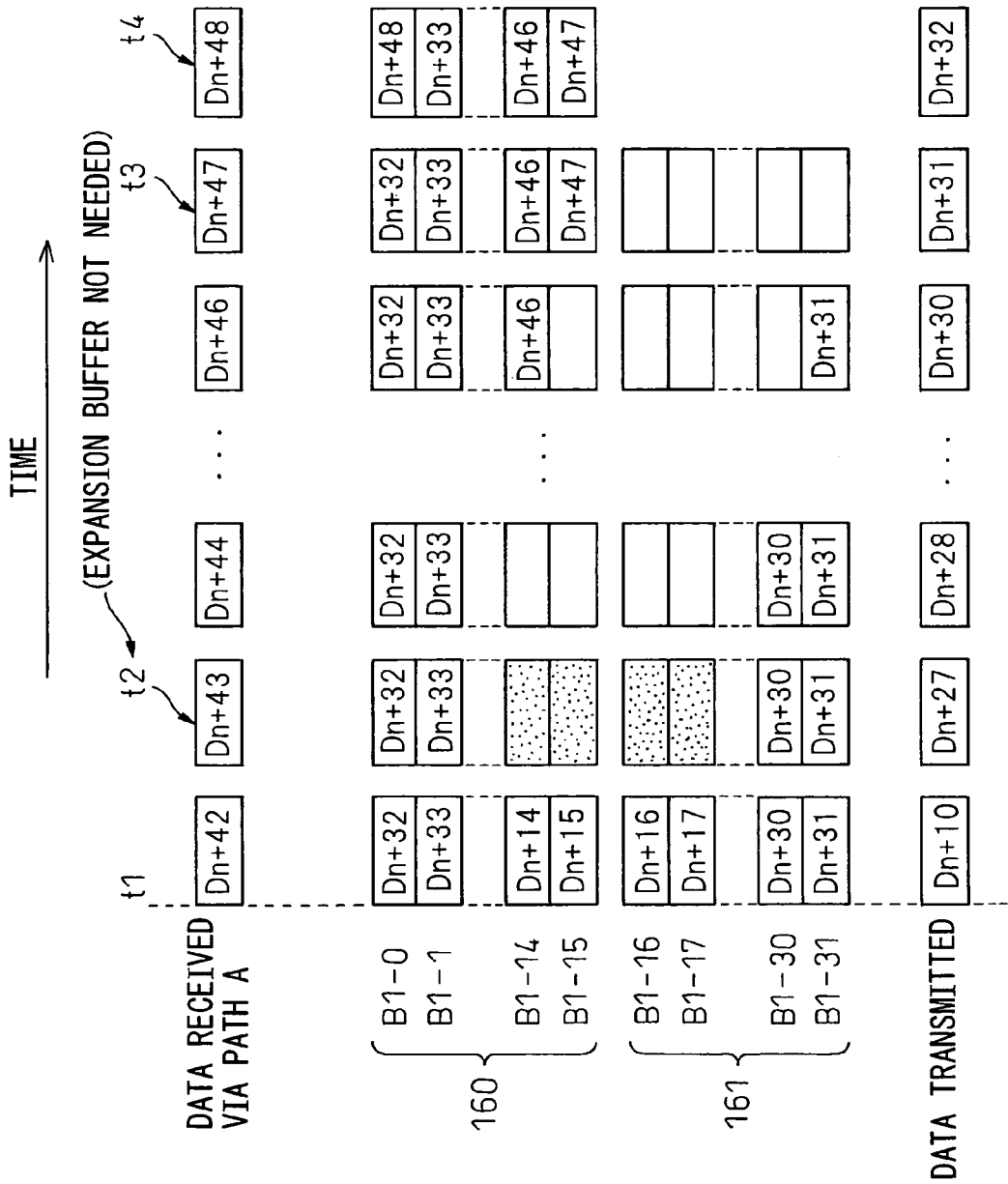

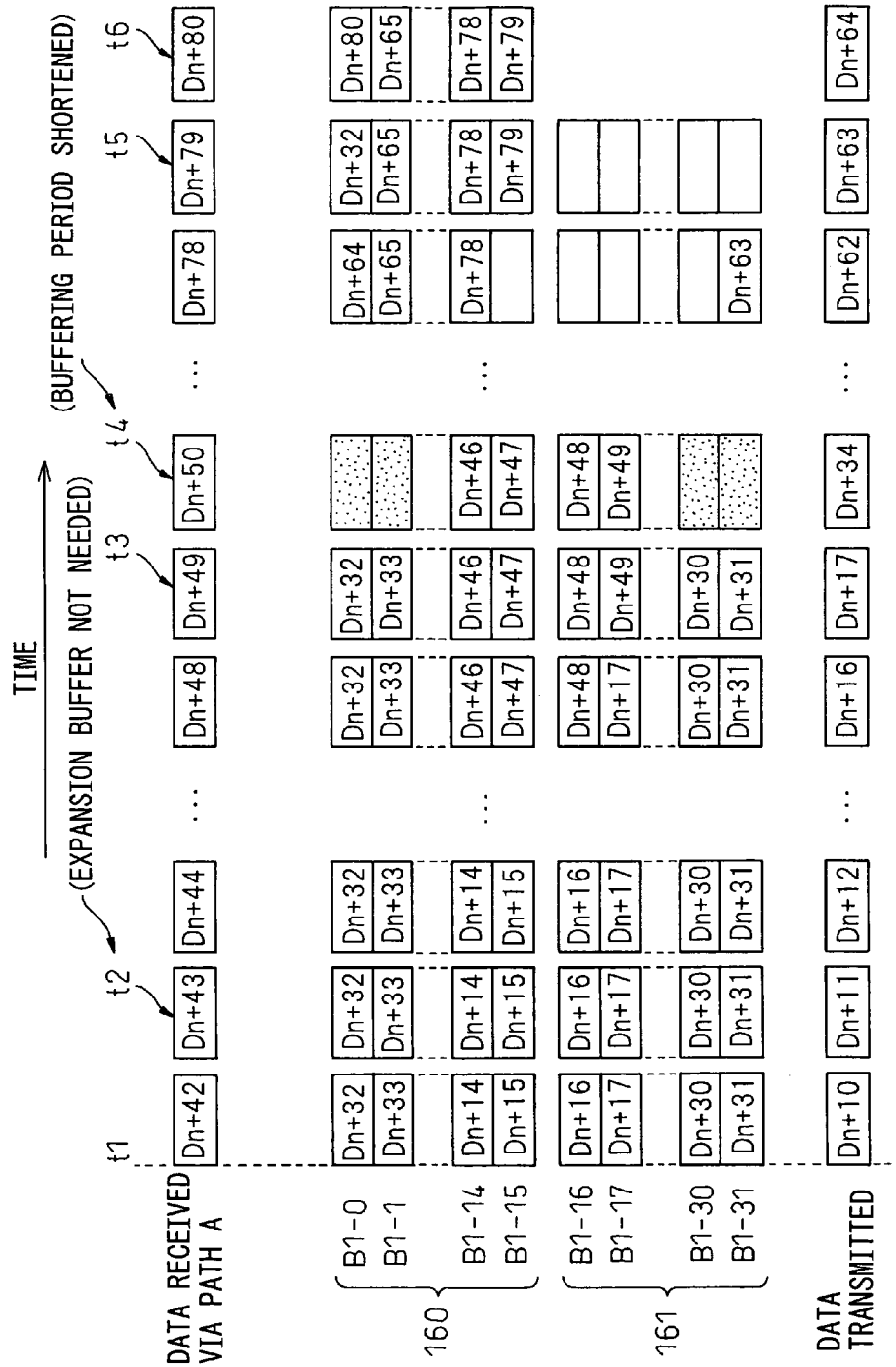

ns; a fixed communication network N; and an exchange 200 connecting between the fixed communication network N and the radio network controller 100.
RADIO NETWORK CONTROLLER AND METHOD FOR HANDOVER OF MOBILE TERMINAL

CROSS REFERENCE TO RELATED APPLICATION

This application is based upon and claims the benefit of priority from the prior Japanese Patent Application No. 2006-189629, filed on Jul. 10, 2006, the entire contents of which are incorporated herein by reference.

BACKGROUND OF THE INVENTION

1. Field of the Invention

The present invention relates to a radio network controller for controlling a plurality of base stations communicating with a mobile terminal via radio in a mobile communication network. The invention also relates to a method for inter-area handover that enables a mobile terminal to continue ongoing communication without interruption when the mobile terminal moves between areas served by different base stations.

2. Description of the Related Art

In a mobile communication network capable of accommodating third generation mobile telephones such as W-CDMA, the technical specifications for which are defined by 3GPP (3rd Generation Partnership Projects), when a mobile terminal moves between areas served by different base stations, the mobile terminal is temporarily connected to both base stations. FIG. 1 is a diagram schematically showing the configuration of a mobile communication network capable of accommodating third generation mobile telephones.

As shown in FIG. 1, the mobile communication network 1 includes: a plurality of base stations BS1, BS2 which communicate with a mobile terminal MT via radio; a serving radio network controller (SRNC) 100 which controls the base stations; a fixed communication network N; and an exchange 200 connecting between the fixed communication network N and the radio network controller 100.

In the condition shown here, the mobile terminal MT is moving from an area A1 served by the first base station BS1 to an area A2 served by the second base station BS2; at this time, the mobile terminal MT is temporarily connected to both base stations.

As a result, the same data transmitted from the mobile terminal MT arrives at the radio network controller 100 via two different paths, i.e., the path 1 originating from the first base station BS1 and the path 2 originating from the second base station BS2.

The radio network controller 100 compares the data qualities of the same data received via the different paths, and selects the higher quality data for use. This improves the communication quality at the time of area switching occurring in connection with the movement of the mobile terminal MT.

In the above case, the data transmitted via the different paths 1 and 2 arrive at the radio network controller 100 at somewhat different times due to the difference between the physical distances that the data travel along the respective paths. The radio network controller 100 performs buffering to accommodate this difference. That is, the radio network controller 100 causes the data received from the shorter data transmission path to wait until the data from the longer data transmission path arrives. How this is done will be described with reference to FIG. 2.

The data to be transmitted from the mobile terminal MT is divided into data transmission units called frames D1 to D6; the frames D1 to D6 transmitted via the path 1 are received by the radio network controller 100 at times t1 to t6, respectively. On the other hand, the frames D1 to D6 transmitted via the path 2 are received by the radio network controller 100 at times t7 to t12, respectively, with a time delay ΔT of nearly four frame periods with respect to the times t1 to t6 at which the same frames transmitted via the path 1 were received. Therefore, buffers B1 to B4 for buffering four frames are provided in the radio network controller 100.

In this patent specification and the appended claims, the term "frame" is used to refer to data whose amount corresponds to one data transmission unit in the data transmission between the mobile terminal MT and the radio network controller 100. It is therefore to be understood that the term, when written simply as "frame", may be used to refer to only the payload which is the main body of the transmitted data, as well as to the data containing the payload with header information appended thereto.

When the frame D1 is received at time t1, the radio network controller 100 stores the frame D1 in the buffer B1. Likewise, when the frames D2 to D4 are received at times t2 to t4, respectively, the received frames D2 to D4 are stored in the respective buffers B2 to B4.

Thereafter, when the frame D1 transmitted via the path 2 is received at time t7, the radio network controller 100 reads the buffer B1 to retrieve the frame D1 received via the path 1, compares the data quality between these frames, and selects the higher quality frame for transmission (time t13). At this time, the buffer B1 is emptied, so that the next frame D5 arriving via the path 1 is stored in the buffer B1. Thereafter, the same operation is repeated.

SUMMARY OF THE INVENTION

The buffer length of the buffers (B1 to B4) provided in the above radio network controller 100, that is, the number of frames that can be simultaneously buffered from among the frames received from one mobile terminal via one path, is determined by the design of the mobile communication network 1, in particular, by the arrangement of the base stations.

More specifically, once the arrangement of the adjacent areas between which a handover of the mobile terminal MT is to be carried out is determined, the buffer length is determined in accordance with the difference between the data transmission times from the base stations, located in the respective areas, to the radio network controller 100.

Alternatively, the buffer length is determined in advance, and the arrangement of the base stations is determined so that the difference between the data transmission times from the base stations located in the respective areas to the radio network controller 100 will not exceed the data transmission time difference that can be accommodated by the predetermined buffer length.

However, even when the buffer length is determined by considering the data transmission time difference between the adjacent areas, or when the areas are arranged by considering the buffer length, a situation can occur where the base station serving an area that is not the intended adjacent area connects to the mobile terminal, depending on geographical and various other conditions. FIG. 3 is a diagram for explaining a situation in which, when a handover between the adjacent base stations BS1 and BS2 is in progress, another unexpected base station BSX becomes connected to the mobile terminal MT.

As shown, the area AX served by the base station BSX is a non-adjacent area located away from the area A1. However, a situation can occur where radiowaves radiated from the base station BSX reach the mobile terminal MT, depending on various factors. If such a situation occurs, a channel passing through the base station BSX serving the area AX may be established with the radio network controller 100 even when the mobile terminal MT is moving from the area A1 into the area A2.

Here, as the area AX is not the area adjacent to the area A1 that has been arranged by considering the predetermined buffer length, the difference between the data transmission time along the path X originating from the base station BSX and the data transmission time along the originally intended path 1 may exceed the data transmission time difference that can be accommodated by the designed buffer length.

For example, when buffers for four frames are provided, as earlier described with reference to FIG. 2, if the difference between the transmission time along the path 1 and the transmission time along the path X corresponds to five or more frame periods, the frames received via the path 1 cannot be held in the buffers until the frames transmitted via the path X begin to arrive; as a result, comparisons between the frames cannot be made. In the prior art, therefore, the radio network controller 100 clears the connection established with an area causing such a large transmission time difference.

That is, when a new base station is detected that can communicate with the mobile terminal MT, the radio network controller 100 temporarily establishes a connection with that base station for the mobile terminal MT. Then, the transmission time along the established path is measured before commencing the intended data transfer. If the difference between the thus measured transmission time and the transmission time along the existing path exceeds a given set value, the temporarily established connection is cleared.

Since the area AX is not the originally intended destination area, if a connection is not established with the area AX, this should normally present no problem as long as the handover is carried out properly between the adjacent areas A1 and A2.

However, depending on the radio conditions or geographical conditions, a situation can occur where the mobile terminal MT is not connected to the base station BS2 serving the target area A2, but is connected only to the base station BSX in the area AX when the mobile terminal MT moves out of the source area A1. If, at this time, the connection with the base station BSX is cut off due to the buffer length limitation, the mobile terminal MT loses its communicating party, and the handover between the areas fails, resulting in disconnection of the communication itself, even when the data transfer can be performed via the base station BSX.

In view of the above problem, it is an object of the present invention to maintain the connection with such a base station when the mobile terminal moving between the adjacent areas becomes able to communicate with that base station, even when that base station is not one serving the area to which the communication is originally intended to be handed-over.

To achieve the above object, according to the present invention, the buffer for buffering the data transmitted from the same mobile terminal and arriving at the radio network controller via different base stations is expanded in accordance with the magnitude of the difference between the data transmission times along the paths from the different base stations to the radio network controller.

For example, in the above situation described with reference to FIG. 3, when the radio network controller 100 has detected the base station BSX as a new base station connected to the mobile terminal MT while the mobile terminal MT is communicating with the base station BS1 serving the source area A1, the buffer is expanded in accordance with the magnitude of the difference between the data transmission time from the base station BS1 to the radio controller 100 and the data transmission time from the base station BSX to the radio controller 100.

If the mobile terminal MT moves and, as a result, the mobile terminal MT is connected only to the base station BSX, the buffer expansion is not needed, so that the buffer length is reduced back to its original size.

According to the present invention, even when the mobile terminal MT becomes connected only to the base station serving an area other than the area to which the communication is originally intended to be handed over, and when the data transmission time from the base station in that other area to the radio network controller is significantly different from the data transmission time from the base station serving the area to which the communication is intended to be handed over to the radio network controller, the connection with the base station in that other area can be maintained, thereby reducing the chance of the communication being disconnected during the handover.

Furthermore, according to the present invention, since a large buffer need only be assigned only to the terminal that needs buffer expansion, storage capacity for the buffer can be reduced compared with a method that assigns a large fixed buffer indiscriminately to each connected terminal.

That is, according to a first mode of the present invention, there is provided a radio network controller for controlling a plurality of base stations communicating with a mobile terminal via radio, and for selecting a frame to be transmitted to a fixed network from among frames having same content which is received from the same mobile terminal via different base stations, the radio network controller comprising: a buffer which buffers the frames respectively received from the different base stations; a transmission time difference detecting section which detects a data transmission time difference as a difference between data transmission times required to transmit data from the different base stations to the radio network controller; and a buffer control section which expands the buffer in accordance with the magnitude of the data transmission time difference.

The buffer control section may expand the buffer, for example, when the data transmission time difference between a new base station commencing communication with the same mobile terminal and another base station already communicating with that same mobile terminal is larger than a prescribed set value.

Here, the prescribed set value may be chosen to represent a length of time that is set equal to or shorter than the time required to receive the same number of frames as the number of frames that the buffer, before expansion, was capable of simultaneously buffering from among the frames arriving via the same base station.

The radio network controller may further include a buffer assigning section which assigns storage locations in the buffer to the received frames. The storage locations in the buffer to be assigned to the frames may each be determined, for example, in accordance with a remainder that is generated when a frame number is divided by a given divisor, wherein the frame number indicates a frame-order.

When each storage location is determined in accordance with the frame number as described above, if a certain frame is lost during transmission, for example, the storage location of each of the other frames can be determined by referring to its frame number, without being affected by the lost frame. This makes it easier to locate the positions in the buffer at which the frames with the same content, i.e., the frames having the same frame number and received from different base stations, are stored, and serves to simplify the procedure and structure for reading such frames from the buffer when selecting the frame to be transmitted to the fixed network from among the frames with the same content. The above divisor may be chosen to represent the number of bufferable frames that is assigned to the frames arriving via one base station.

The buffer in the radio network controller may include a fixed buffer having a predetermined buffer length and an expansion buffer which is added to the fixed buffer when expanding the buffer.

Here, consider the case where, after the buffer is expanded by adding the expansion buffer, the storage location in the buffer to be assigned to each frame is determined in accordance with the remainder that is generated when the frame number is divided by the given divisor. In order to ensure that every one of the contiguous frames is stored in the fixed buffer before buffer expansion, the fixed buffer has as many storage locations as the number of remainders expected to be generated when the respective frame numbers are divided by the given divisor. When the expansion buffer is added to the fixed buffer, more than one storage location occurs for each of the remainders generated when the respective frame numbers are divided by the given divisor.

Accordingly, after the buffer is expanded, there arises a need to determine in which buffer, the fixed buffer or the expansion buffer, each frame received after the buffer expansion is to be stored when storing such frames having different frame numbers and for which the remainders generated by dividing their frame numbers by the given divisor are the same.

For this purpose, the buffer assigning section may determine in which buffer, the fixed buffer or the expansion buffer, each frame received after the buffer expansion is to be stored, by referring to a quotient that is obtained when the frame number of any of the frames held in the fixed buffer at the time of the buffer expansion is divided by the given divisor.

For example, if the quotient is odd when the frame number of the frame held in the fixed buffer at the time of the buffer expansion is divided by the given divisor, then the buffer assigning section stores the frame received after the buffer expansion in the fixed buffer if the quotient obtained by dividing the frame number of the received frame by the given divisor is odd, but stores the received frame in the expansion buffer if the quotient is even; on the other hand, if the quotient is even when the frame number of the frame held in the fixed buffer at the time the buffer expansion is divided by the given divisor, then the buffer assigning section stores the frame received after the buffer expansion in the fixed buffer if the quotient obtained by dividing the frame number of the received frame by the given divisor is even, but stores the received frame in the expansion buffer if the quotient is odd.

Here, the storage locations in the buffer to be assigned to the frames may each be determined in accordance with a prescribed low-order bit sequence in a bit sequence representing the frame number which indicates a frame-order.

In this case, when the value of the bit one bit higher than the prescribed low-order bit sequence in the bit sequence representing the frame number of the frame received after the buffer expansion is equal to the value of the bit one bit higher than the prescribed low-order bit sequence in the bit sequence representing the frame number of any of the frames held in the fixed buffer at the time of the buffer expansion, the buffer assigning section may store the frame received after the buffer expansion in the fixed buffer, but when the values of the one-bit-higher bits do not match, the buffer assigning section may store the frame received after the buffer expansion in the expansion buffer.

According to a second mode of the present invention, there is provided a method for handover of a mobile terminal, wherein a radio network controller for controlling a plurality of different base stations receives frames having same content from the same mobile terminal via the different base stations, selects one of the received frames, and transmits the selected frame to a fixed network, and wherein the frames received by the radio network controller via the different base stations are buffered in a buffer, a data transmission time difference between the different base stations as a difference between data transmission times required to transmit data from the base stations to the radio network controller is detected, and the buffer is expanded in accordance with the magnitude of the detected data transmission time difference.

At this time, whether to expand or not expand the buffer can be determined based on whether or not the data transmission time difference detected between a new base station commencing communication with the mobile terminal and another base station already communicating with the mobile terminal is larger than a prescribed set value.

The prescribed set value may be chosen to represent a length of time that is set equal to or shorter than the time required to receive the same number of frames as the number of frames that the buffer before expansion is capable of simultaneously buffering from among the frames arriving via the same base station.

Storage locations in the buffer to be assigned to the frames may each be determined in accordance with a remainder that is generated when a frame number is divided by a given divisor, wherein the frame number indicates a frame-order. Here, the divisor may be chosen to represent the number of bufferable frames that is assigned to the frames arriving via one base station.

The buffer may be expanded by adding an expansion buffer to a fixed buffer having a predetermined buffer length. In this case, a determination as to in which buffer, the fixed buffer or the expansion buffer, each frame received after the buffer expansion is to be stored may be made by referring to a quotient that is obtained when the frame number of any of the frames held in the fixed buffer at the time of the buffer expansion is divided by the given divisor.

For example, if the quotient is odd when the frame number of the frame held in the fixed buffer at the time of the buffer expansion is divided by the given divisor, then the frame received after the buffer expansion may be stored in the fixed buffer if the quotient obtained by dividing the frame number of the received frame by the given divisor is odd but, if the quotient is even, the received frame may be stored in the expansion buffer; on the other hand, if the quotient is even when the frame number of the frame held in the fixed buffer at the time of the buffer expansion is divided by the given divisor, then the frame received after the buffer expansion may be stored in the fixed buffer if the quotient obtained by dividing the frame number of the received frame by the given divisor is even but, if the quotient is odd, the received frame may be stored in the expansion buffer.

Storage locations in the buffer to be assigned to the frames may each be determined in accordance with a prescribed low-order bit sequence in a bit sequence representing a frame number which indicates a frame-order. In this case, when the value of the bit one bit higher than the prescribed low-order bit sequence in the bit sequence representing the frame number of the frame received after the buffer expansion is equal to the value of the bit one bit higher than the low-order bit sequence in the bit sequence representing the frame number of any of the frames held in the fixed buffer at the time of the buffer expansion, the frame received after the buffer expansion may be stored in the fixed buffer, but when the values of the one-bit-higher bits do not match, the frame received after the buffer expansion may be stored in the expansion buffer.

BRIEF DESCRIPTION OF THE DRAWINGS

The present invention will be more clearly understood from the description as set forth below with reference to the accompanying drawings, wherein:

FIG. 7 is a diagram showing an example of the data structure of a resource management table;

FIG. 8 is a diagram showing an example of the data structure of a buffering period table;

FIG. 16 is a diagram showing an example of the data structure of a control flag table;

FIG. 21 is a diagram for explaining a procedure for shortening the buffering period when receiving audio data;

FIG. 22 is a diagram for explaining a procedure for shortening the buffering period when receiving packet data.

DESCRIPTION OF THE PREFERRED EMBODIMENTS

Preferred embodiments of the present invention will be described in detail below while referring to the attached figures.

Figure 2:
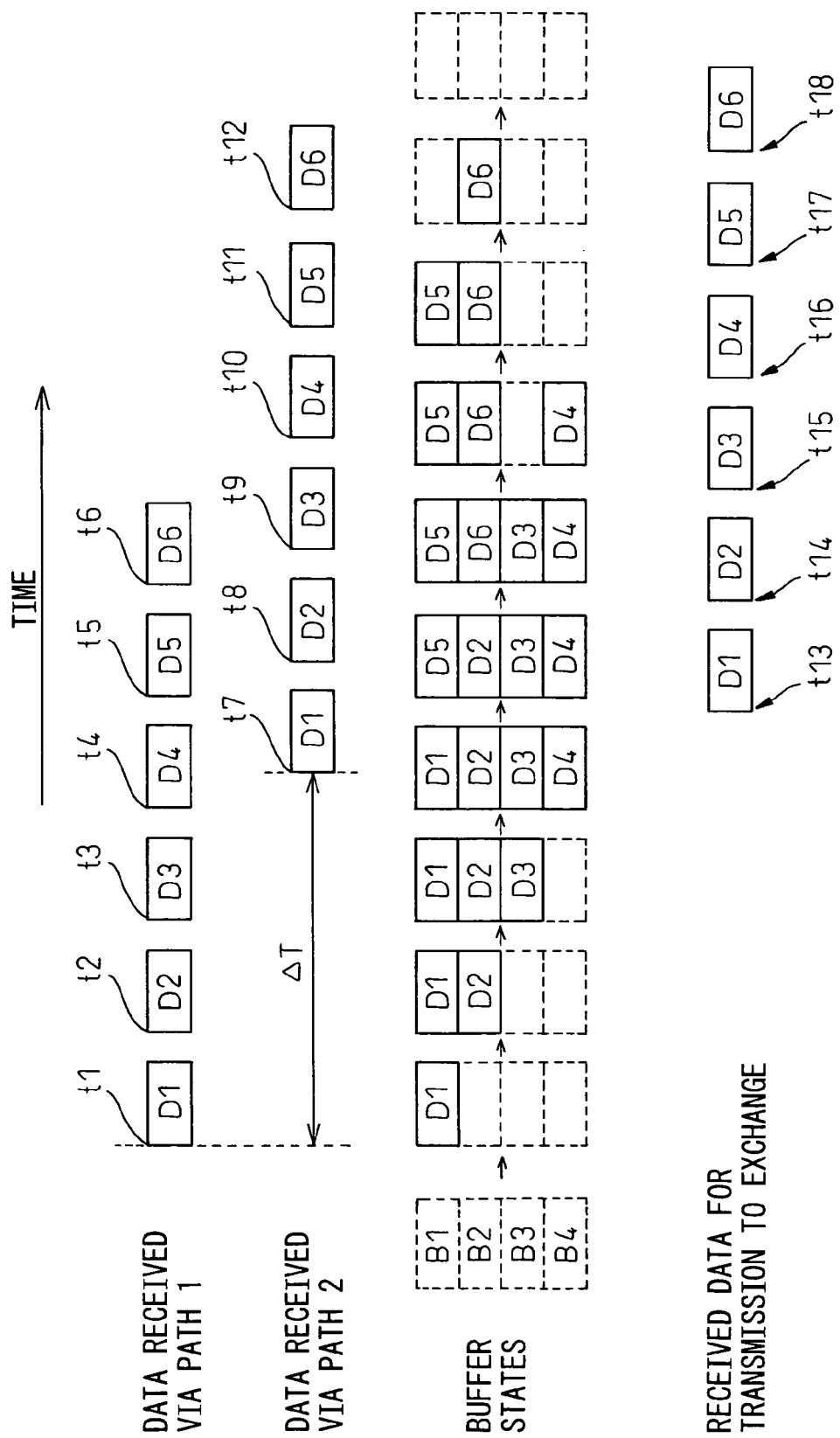
FIG. 2 is a diagram for explaining how buffering is done in a radio network controller.
Figure 3:
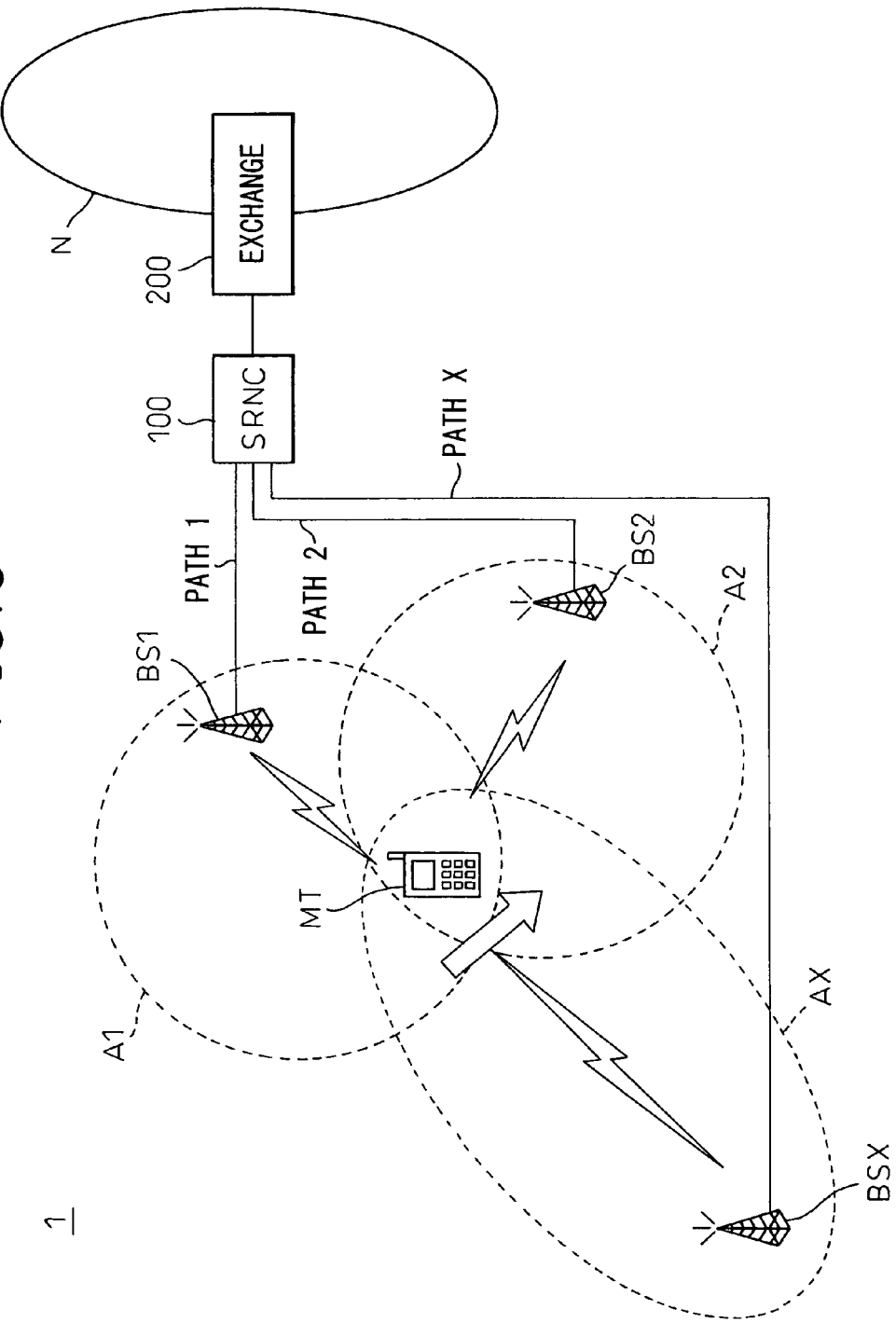
FIG. 3 is a diagram for explaining a situation in which a mobile terminal is connected to an unintended base station during a handover between adjacent base stations.
Figure 4:
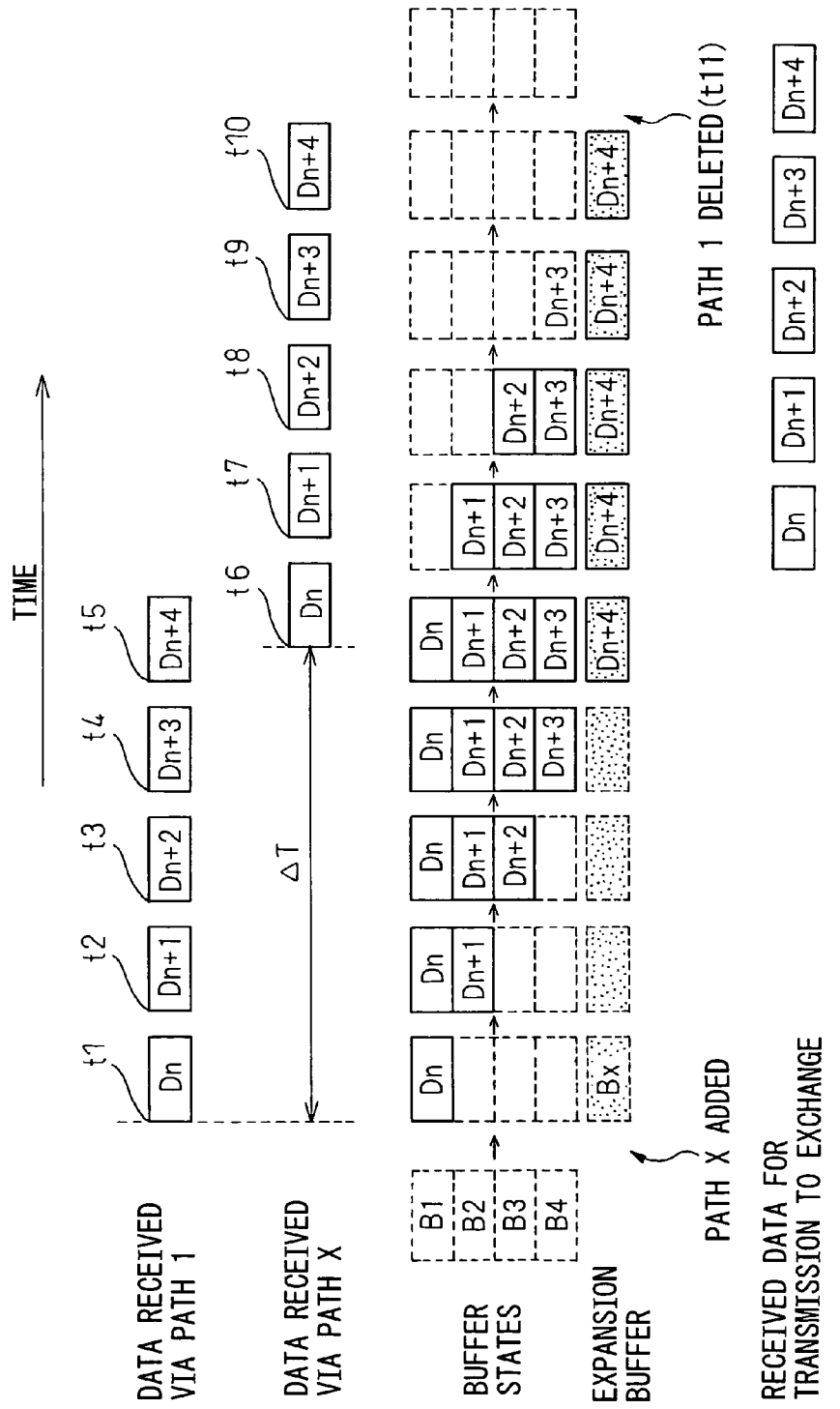
FIG. 4 is a diagram showing an example of how buffer control is performed in a radio network controller according to the present invention.

FIG. 4 is a diagram showing an example of how buffer control is performed in a radio network controller according to the present invention. In the description hereinafter given with reference to FIG. 4, descriptions of the radio network controller 100, mobile terminal MT, fixed communication network N, exchange 200, base stations BS1, BS2, and BSX, areas A1, A2, and AX, and paths 1, 2, and X are the same as those previously given with reference to FIGS. 1 to 3 and, therefore, will not be repeated here, for simplicity.

Frames Dn to Dn+4 output from the mobile terminal MT and transmitted via the path 1 are received by the radio network controller 100 at times t1 to t5, respectively. On the other hand, the frames Dn to Dn+4 transmitted via the path X are received by the radio network controller 100 at times t6 to t10, respectively, with a time delay $\Delta T$ of nearly five frame periods with respect to the times t1 to t5 at which the same frames transmitted via the first base station BS1 were received.

Here, the radio network controller 100 is provided with fixed buffers B1 to B4 to accommodate the difference between the data transmission times along the paths from the respective base stations BS1 and BS2 serving the adjacent areas A1 and A2, between which the usual handover takes place, to the radio network controller 100.

The combined buffer length of the fixed buffers B1 to B4 is equal to four frames, and is therefore shorter than the length necessary for accommodating five frames which represent the difference between the data transmission times along the paths from the base stations BS1 and BSX to the radio network controller 100. Accordingly, the fixed buffers B1 to B4 cannot hold the frames received via the path 1 until the same frames transmitted via the path X begin to arrive at the radio network controller 100.

In view of this, in the radio network controller 100 according to the present invention, an expansion buffer is added to the buffers B1 to B4 (for example, when the new base station BSX commences communication with the mobile terminal MT) if the difference between the data transmission time from the base station BSX to the radio network controller 100 and the data transmission time from the base station BS1 currently communicating with the mobile terminal MT to the radio network controller 100 is larger than a given set value.

For example, as shown in FIG. 4, suppose that the difference between the data transmission times from the respective base stations BSX and BS1 to the radio network controller 100 is equal to five frame periods. In this case, the expansion buffer Bx is added to expand the buffer capacity in the radio network controller 100 to five frames, thereby enabling the frame Dn received via the path 1 to be held in the buffer until the same frame Dn transmitted via the path X arrives at the radio network controller 100 at time t6.

When, for example, the mobile terminal MT further moves, and the connection between the mobile terminal MT and the base station BS1 serving the source area A1 is terminated at time t11, the expansion buffer Bx is deleted.

Figure 1:
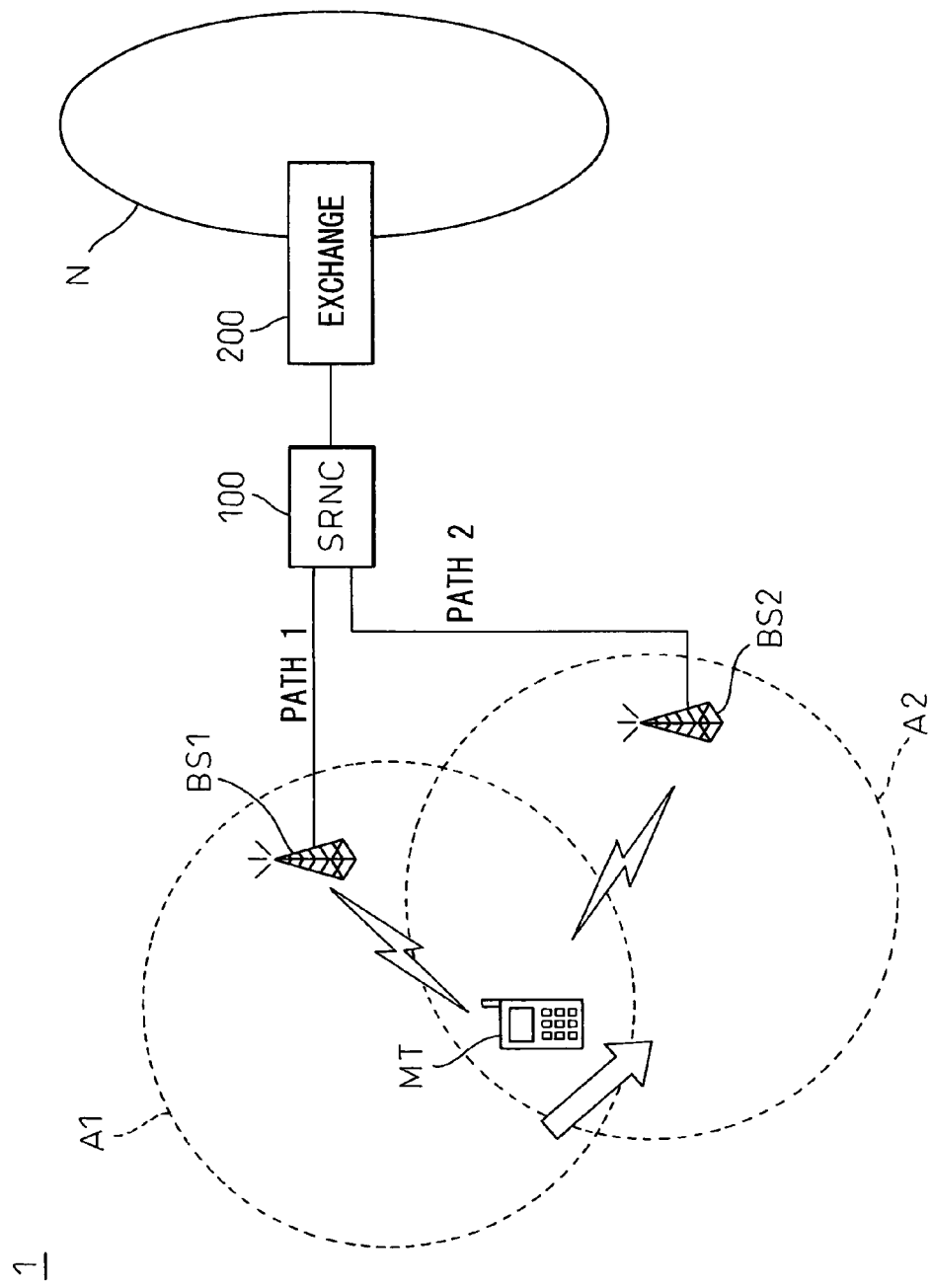
FIG. 1 is a diagram schematically showing the configuration of a mobile communication network capable of accommodating third generation mobile telephones.
Figure 5:
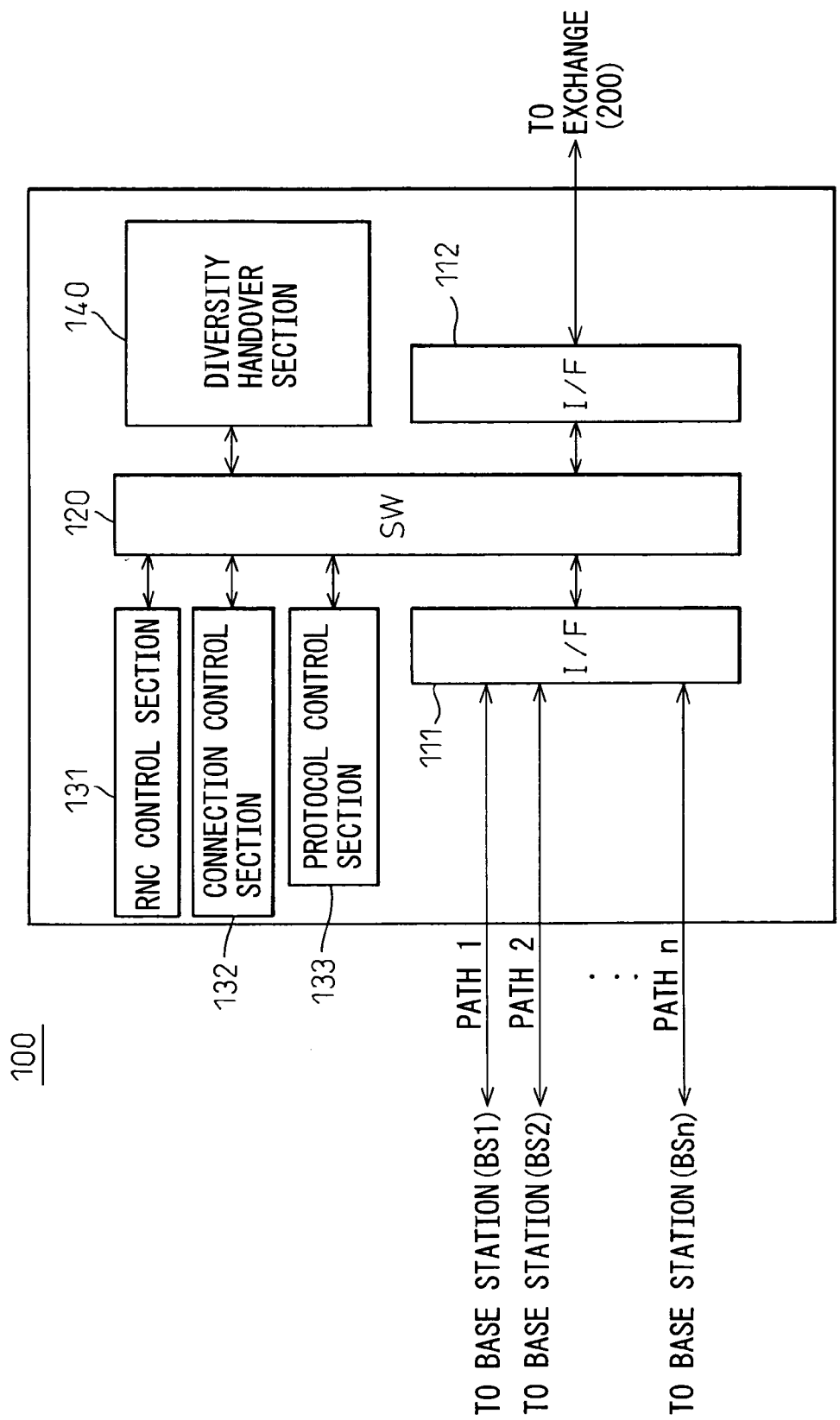
FIG. 5 is a diagram schematically showing the configuration of a radio network controller according to an embodiment of the present invention.

FIG. 5 is a diagram schematically showing the configuration of a radio network controller according to an embodiment of the present invention, which is provided in the mobile communication network shown in FIG. 1. The radio network controller 100 comprises: an interface section 111 for interfacing between the radio network controller 100 and the base stations BS1, ..., BSn; an interface section 112 for interfacing between the radio network controller 100 and the exchange 200; and a switch section (SW) 120 for switching paths for data transferred between the interface sections 111 and 112, and the various component elements 131 to 133 and 140 contained in the radio network controller 100, the component element 131 being an RNC control section for controlling the entire operation of the radio network controller 100, 132 a connection control section for controlling communication connections between the exchange 200 and the base stations BS1 to BSn and also communication connections with the mobile terminal MT established via the base stations BS1 to BSn, 133 a protocol control section for executing protocols for these communication connections, and 140 a diversity handover control section which is described hereinafter.

Figure 6:
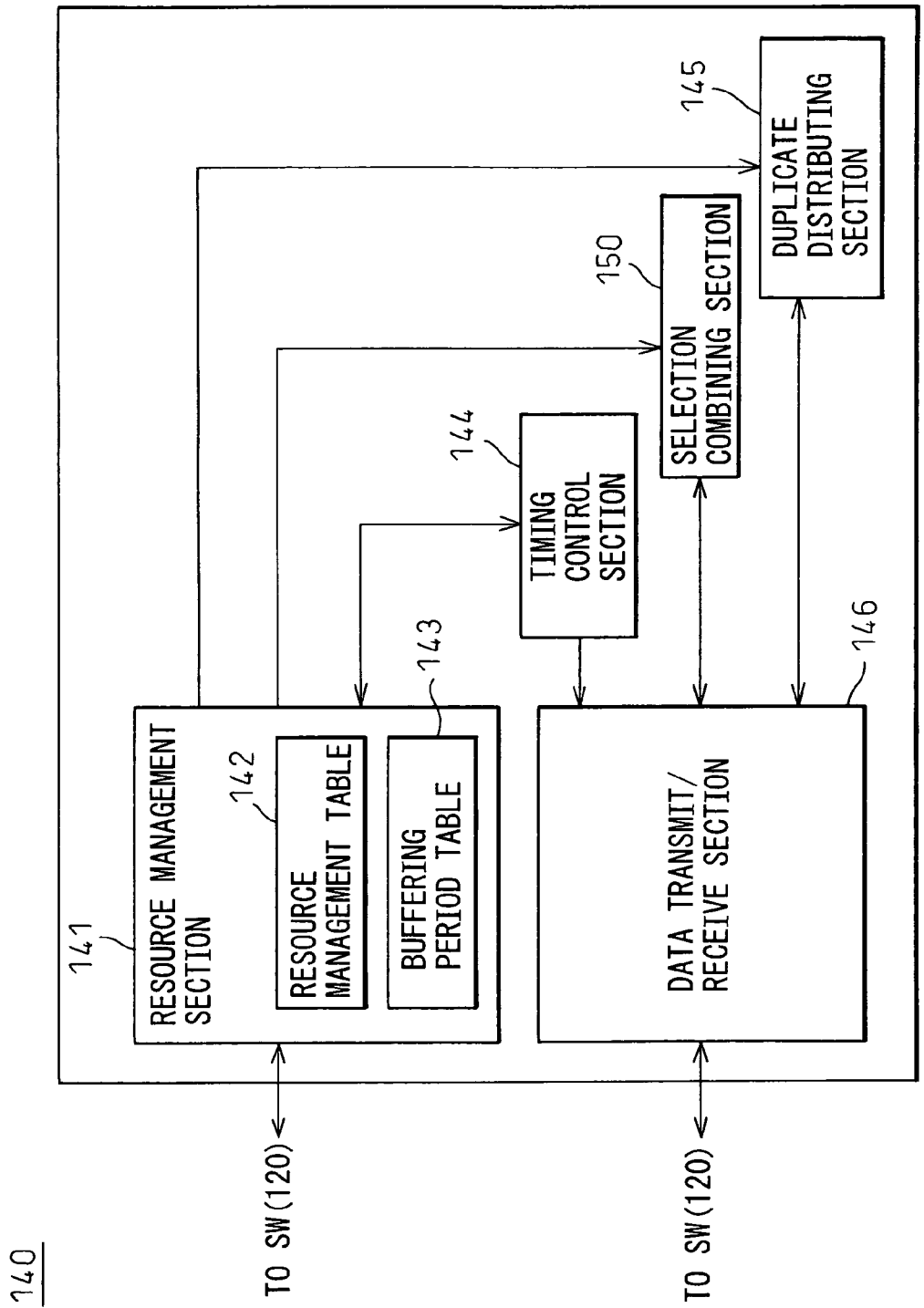
FIG. 6 is a diagram schematically showing the configuration of a diversity handover control section included in FIG. 5.

FIG. 6 is a diagram schematically showing the configuration of the diversity handover control section 140 included in FIG. 5. The diversity handover control section 140 controls handover operations in which data are transferred to and from the same mobile terminal MT via a plurality of different base stations. For this purpose, the diversity handover control section 140 comprises a resource management section 141, a timing control section 144, a selection combining section 150, and a duplicate distributing section 145, which will be described below.

The resource management section 141 manages the correspondence between the mobile terminals MTs currently performing data transfers to and from the radio network controller 100 and the frames transmitted from the respective mobile terminals MTs via the base stations BS1 to BSn. For this purpose, the resource management section 141 maintains a resource management table 142, such as shown in FIG. 7, in a prescribed storage area (not shown).

The base stations BS1 to BSn receive frames from the mobile terminals MTs and transmit them to the radio network controller 100 by appending to the header information carried in each frame a data identification number unique to each mobile terminal connected thereto. This unique data identification number assigned to each mobile terminal differs among the different base stations BS1 to BSn managed by the radio network controller 100.

Here, the resource management section 141 stores the identification number of each currently connected mobile terminal MT in the resource management table 142 by associating with it the data identification number appended to each frame received by the radio network controller 100 from the mobile terminal MT. The resource management table 142 shown by way of example in FIG. 7 manages each terminal identification number by associating with it four data identification numbers so that the radio network controller 100 can connect to the mobile terminal MT simultaneously via four of n paths 1 to n.

By searching through the resource management table 142 using the data identification numbers appended to the frames received from the respective base stations BS1 to BSn, the originating mobile terminal MT of each frame can be identified.

The timing control section 144 acquires timing synchronization for data transmission between the radio network controller 100 and the respective base stations BS1 to BSn in accordance with the synchronization acquisition procedure defined by the 3GPP.

According to the synchronization acquisition procedure defined by the 3GPP, the transmission times at which the respective base stations BS1 to BSn periodically transmit data to the mobile terminal MT are synchronized to each other, so that the data received from the radio network controller 100 for delivery to the mobile terminal MT is transmitted out simultaneously from the respective base stations toward the mobile terminal MT. The base stations BS1 to BSn each have a receiving window for the data to be received from the radio network controller 100, and only the data received during the receiving window period by the base stations BS1 to BSn is transmitted out during the subsequent transmission period.

For this purpose, each of the base stations BS1 to BSn has a function that, upon receiving a prescribed control frame, sends a time difference signal to the radio network controller 100 to indicate the time difference between the receiving time of the control frame and the end time of the receiving window.

The end time of the receiving window in each of the base stations BS1 to BSn is also known to the radio network controller 100, and the timing control section 144 sends the control frame to each of the base stations BS1 to BSn at a time instant that is earlier than the end time of the receiving window by a given amount of time. Then, by acquiring the time difference signal from each of the base stations BS1 to BSn, the timing control section 144 acquires the adjusted data transmission time for each of the paths 1 to n, which is necessary to synchronize the timing for the transmission of data from the respective base stations BS1 to BSn to the mobile terminal MT.

Here, since it is already known that the time at which the timing control section 144 transmits the control frame is earlier than the end time of the receiving window by a given amount of time, and since the time difference between the actual receiving time and the end time of the receiving window can be acquired, the timing control section 144 can detect the data transmission time required from each of the base stations BS1 to BSn to the radio network controller 100.

Therefore, for each mobile terminal MT currently connected to the radio network controller 100, the timing control section 144 detects the data transmission time required from each base station connected to the mobile terminal MT to the radio network controller 100 (that is, the data transmission time along the path passing through each base station), and stores the data transmission time in the resource management table 142 described above with reference to FIG. 7.

The selection combining section 150 compares the frames of the same content that were received via different paths as different versions of the same frame transmitted from the same mobile terminal MT, and selects the highest quality frame for transmission to the exchange 200. For this purpose, the selection combining section 150 includes a buffer for buffering the frames received up to the time at which the last of the frames of the same content transmitted via the different paths differing in data transmission time is expected to arrive.

The frames that each of the base stations BS1 to BSn transmits to the radio network controller 100 are appended with sequentially increasing frame numbers in order to indicate the order in which the frames are transmitted. Here, the time at which a certain frame having a given frame number is transmitted from the base station is made known in advance to the radio network controller 100.

As a result, based on the frame number which indicates the frame-order appended to each frame received from each of the base stations BS1 to BSn, the selection combining section 150 can estimate the time at which the frame was transmitted from the base station. By adding this transmit time to the data transmission time stored for each of the base stations BS1 to BSn in the resource management table 142, the selection combining section 150 can estimate the time at which the frame arrived at the radio network controller 100.

Then, at the time of transmitting data to the exchange 200, the selection combining section 150 reads the buffer to retrieve the frame already received at a time earlier than the current time by a prescribed buffering period and the frames having the same content as that frame and received via other paths, selects the highest quality frame among them, and transmits the selected frame to the exchange 200.

Here, the prescribed buffering period is determined in accordance with the number of frames that the buffer included in the selection combining section 150 can buffer for each mobile terminal and for each path. The number of frames that can be buffered is expanded for each mobile terminal as will be described later, and accordingly, the prescribed buffering period differs for each mobile terminal; therefore, the resource management section 141 manages the buffering period for each mobile terminal by storing it in a buffering period table 143. One example of the structure of the buffering period table 143 is shown in FIG. 8.

The duplicate distributing section 145 duplicates each frame received from the fixed communication network N, and transmits the frames out onto all the paths connected to the communicating mobile terminal MT.

The diversity handover control section 140 further comprises a data transmit/receive section 146 through which the data to be transmitted and received by the timing control section 144, selection combining section 150, and duplicate distributing section 145 is transmitted to and received from the base stations BS1 to BSn and the exchange 200.

Figure 9:
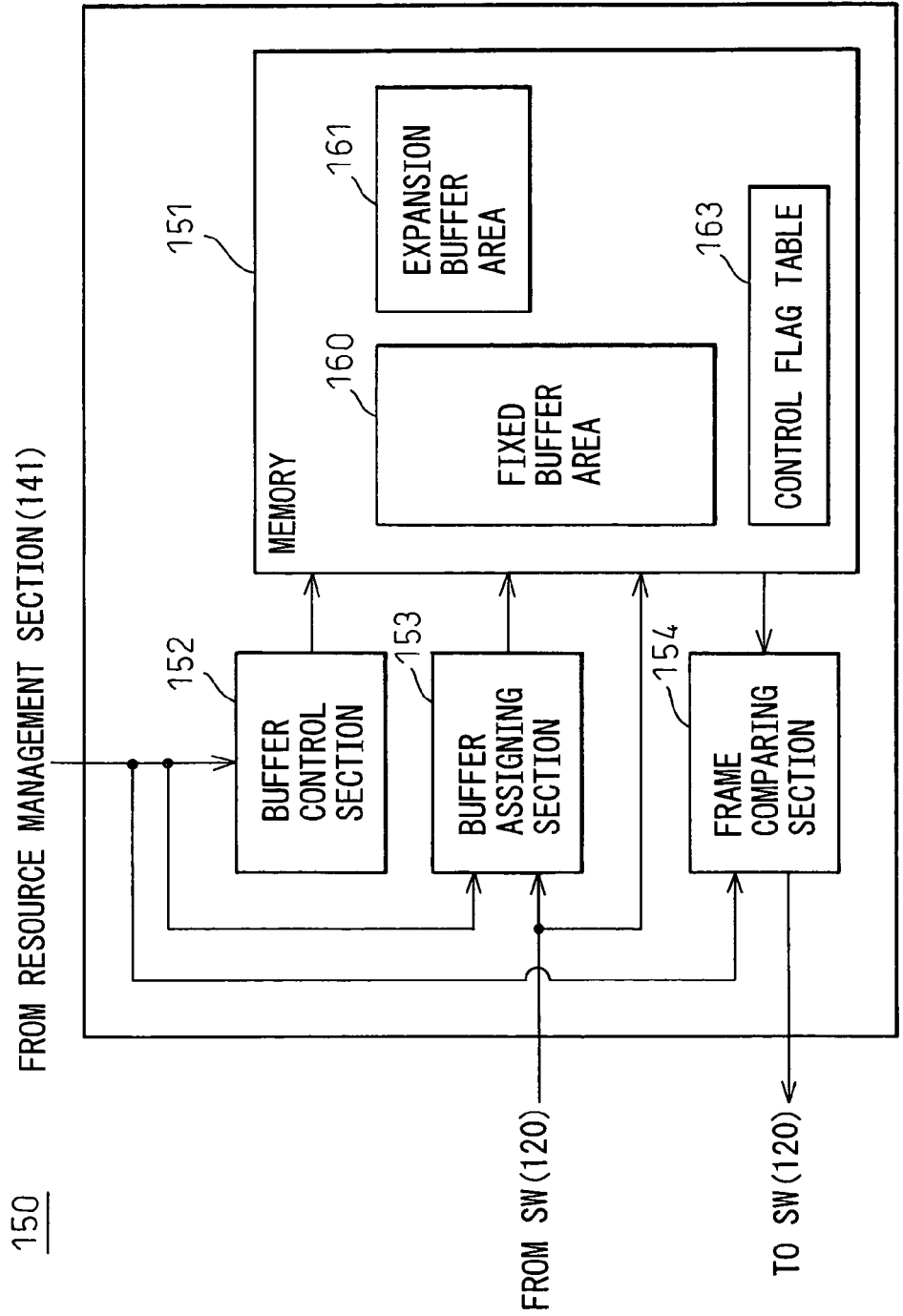
FIG. 9 is a diagram schematically showing the configuration of a selection combining section included in FIG. 6.

FIG. 9 is a diagram schematically showing the configuration of the selection combining section 150 included in FIG. 6. The selection combining section 150 comprises: a memory 151 as a storage device used for buffering received frames; a buffer control section 152 which controls the buffer length; a buffer assigning section 153 which, for each received frame, determines the address of the storage location within the memory 151 for storing the received frame; and a frame comparing section 154 which, at the time of transmitting data to the exchange 200, reads the buffer in the memory 151 to retrieve the frames whose scheduled transmit time has expired, compares the frames of the same content received via different paths, and selects the highest quality frame.

Figure 10:
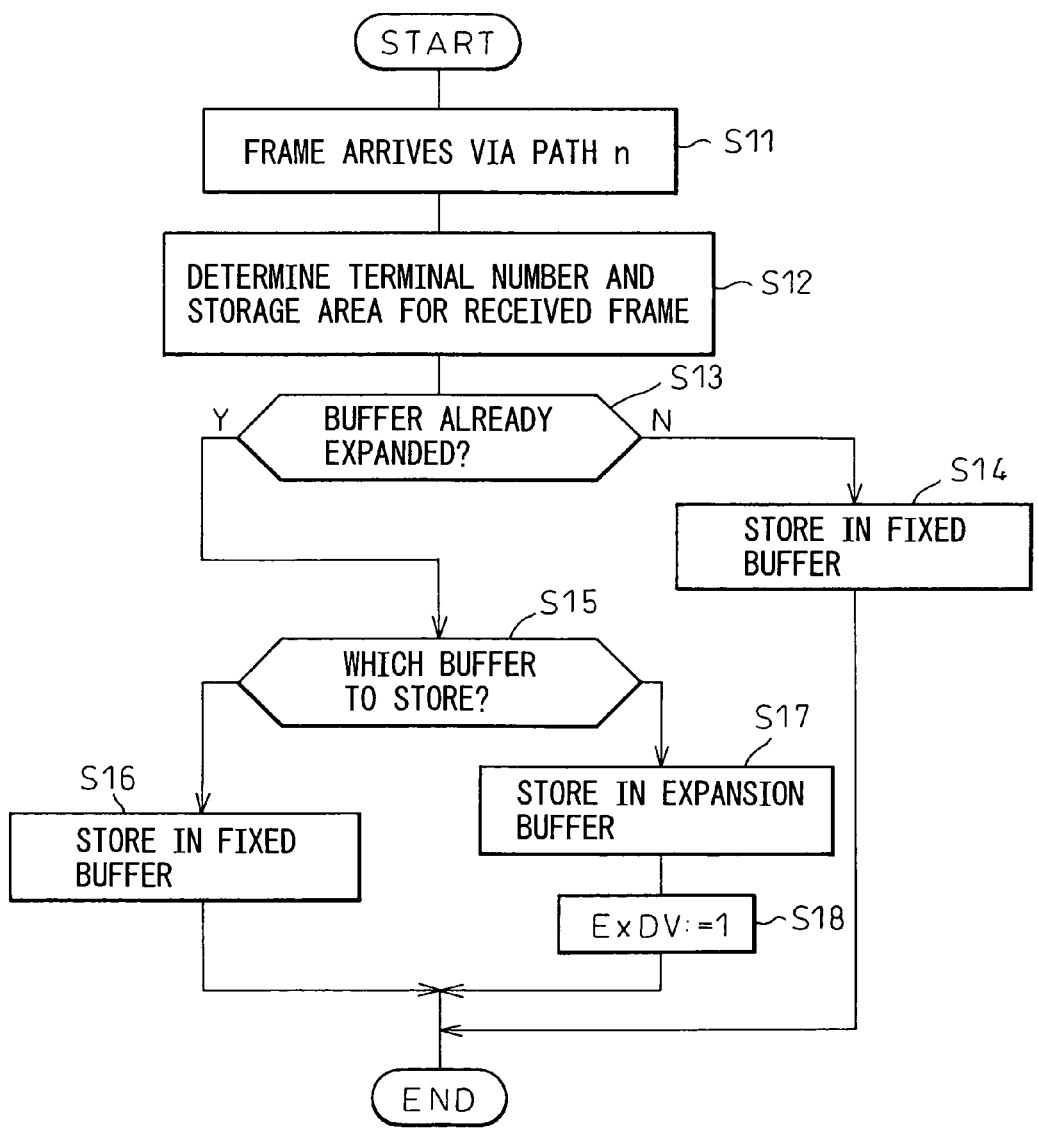
FIG. 10 is a flowchart illustrating a procedure for storing a received frame in a buffer.

FIG. 10 is a flowchart illustrating how the radio network controller 100 that received a frame from the mobile terminal MT stores the frame in the buffer.

First, when the radio network controller 100 receives in step S11 a frame transmitted from the mobile terminal MT via any given path, in step S12 the buffer assigning section 153 in the selection combining section 150 refers to the resource management table 142 in the resource management section 141 and, based on the data identification number appended to the received frame, determines the identification number of the mobile terminal MT that transmitted the frame and the storage area within the buffer assigned to the path via which the frame was transmitted.

Figure 11:
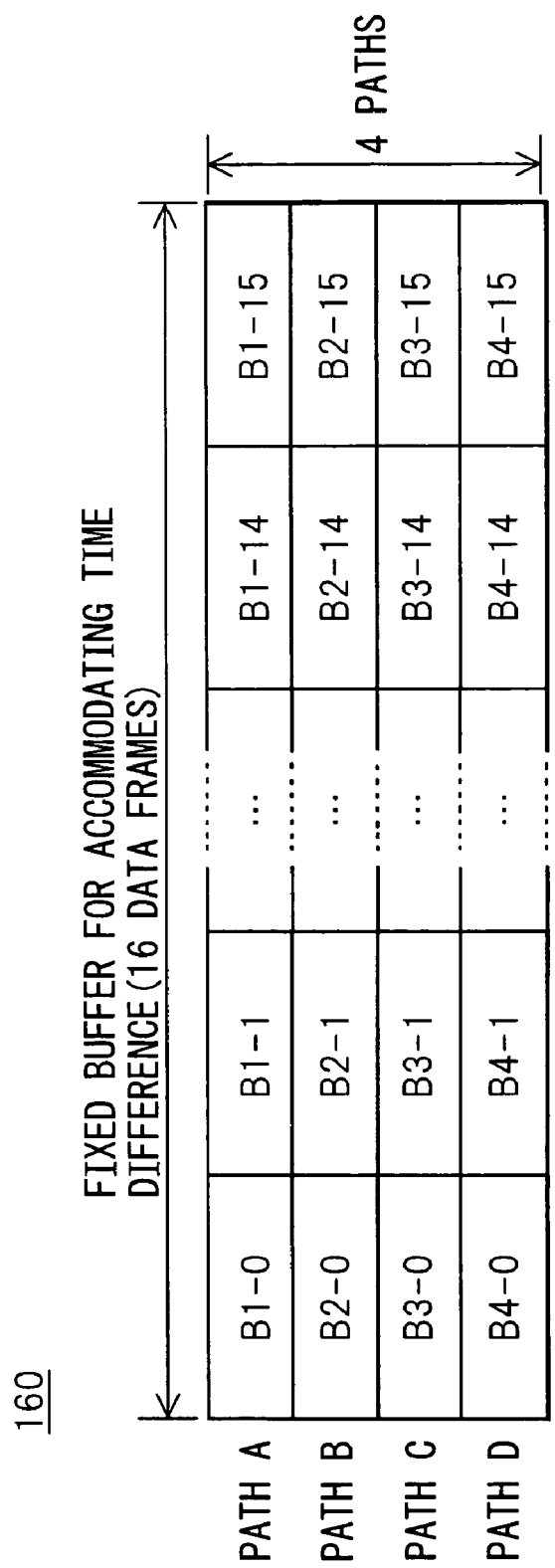
FIG. 11 is a diagram showing a configuration example of a fixed buffer included in FIG. 9.

Here, the buffering operation before buffer expansion will be described first. As will be described below, before buffer expansion, every received frame is stored in a fixed buffer 160 provided in a prescribed storage area within the memory 151 in the selection combining section 150. FIG. 11 is a diagram showing a configuration example of the fixed buffer 160 included in FIG. 9.

In the example shown, the fixed buffer 160 is assigned a storage area that can buffer the frames received via four different paths A to D, up to 16 frames for each path, for each mobile terminal MT connected to the radio network controller 100. FIG. 11 shows that the 16 frames received via the path A from the mobile terminal MT connected to the radio network controller 100 can be stored in order of frame number at 16 storage locations B1-0 to B1-15; likewise, the 16 frames received via the path B from the mobile terminal MT can be stored in order of frame number at respective storage locations B2-0 to B2-15, the 16 frames received via the path C can be stored in order of frame number at respective storage locations B3-0 to B3-15, and the 16 frames received via the path D can be stored in order of frame number at respective storage locations B4-0 to B4-15.

As earlier described, in the resource management table 142 shown in FIG. 7, the identification number of each mobile terminal MT connected to the radio network controller 100 is stored by associating with it the data identification numbers appended to the frames transmitted from the mobile terminal MT via the respective paths.

Here, the buffer areas provided in the fixed buffer 160 for the respective paths A to D are assigned so as to correspond to the respective paths A to D for which data identification numbers are stored in the fields for the respective path in the resource management table 142.

The buffer assigning section 153 determines which of the buffer areas provided for the paths A to D is to be assigned to each received frame, by checking in which of the fields provided in the resource management table 142 for the respective paths A to D is stored the data identification number appended to the received frame.

Next, in step S13, it is determined whether the buffer for buffering the frames received from the mobile terminal MT is expanded or not. Here, the buffer is not expanded yet and, therefore, the process proceeds to step S14.

In step S14, the buffer assigning section 153 stores the received frame in the fixed buffer 160 provided in the prescribed storage area within the memory 151 in the selection combining section 150.

Figure 12:
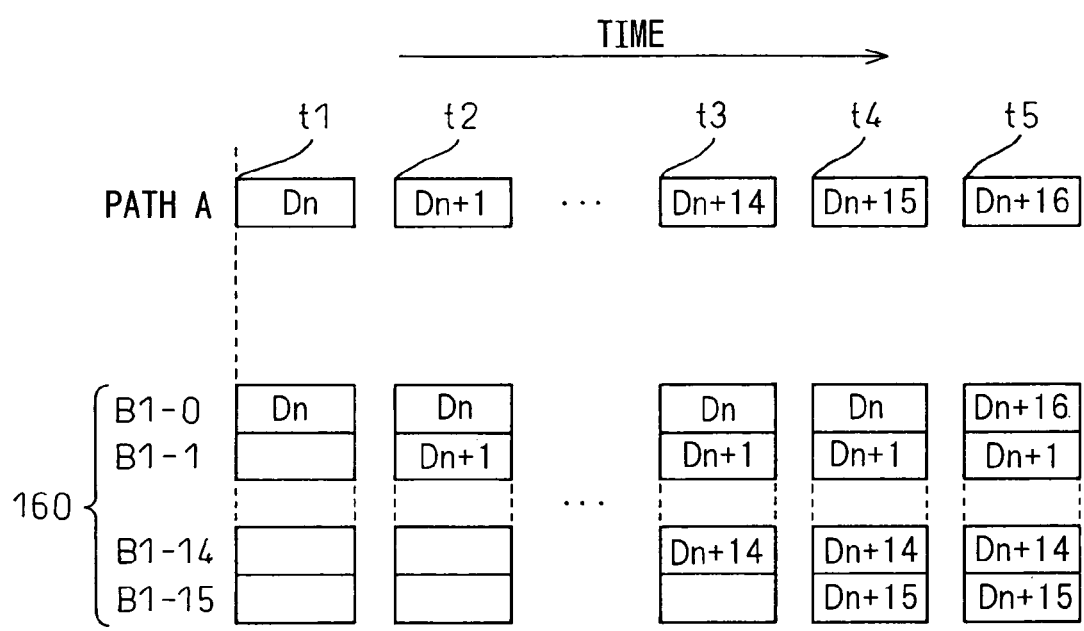
FIG. 12 is a diagram for explaining a procedure for storing received frames in the fixed buffer.

FIG. 12 is a diagram for explaining how the received frames are stored in the fixed buffer 160. The illustrated example shows the case where the frames are received from one of the paths 1 to n, i.e., the path A which is assigned the buffer locations B1-0 to B1-15 in the fixed buffer 160.

As the frames Dn, Dn+1, . . . , Dn+14, and Dn+15 are received at times t1, t2, . . . , t3, and t4, respectively, the frames are stored at the respective buffer locations B1-0 to B1-15 in sequence.

When the 17th frame Dn+16 is received at time t5, the number of received frames exceeds 16 frames, i.e., the buffer length of the fixed buffer 160 provided for each mobile terminal and for each path; therefore, the storage location of this frame Dn+16 goes back to the starting location B1-0.

When storing the received frames at the 16 buffer locations in sequence, the buffer assigning section 153 determines at which of the 16 buffer locations each received frame is to be stored, based on the frame number appended to the received frame.

The buffer assigning section 153 assigns one of the 16 buffer locations to each received frame by referring to the value 0 to 15 indicated by the low-order four bits of the frame number. For example, the frame with the frame number 0 is stored at the buffer location B1-0, the frame with the frame number 5 is stored at the buffer location B1-5, and the frame with the frame number 33 is stored at the buffer location B1-1.

Figure 13:
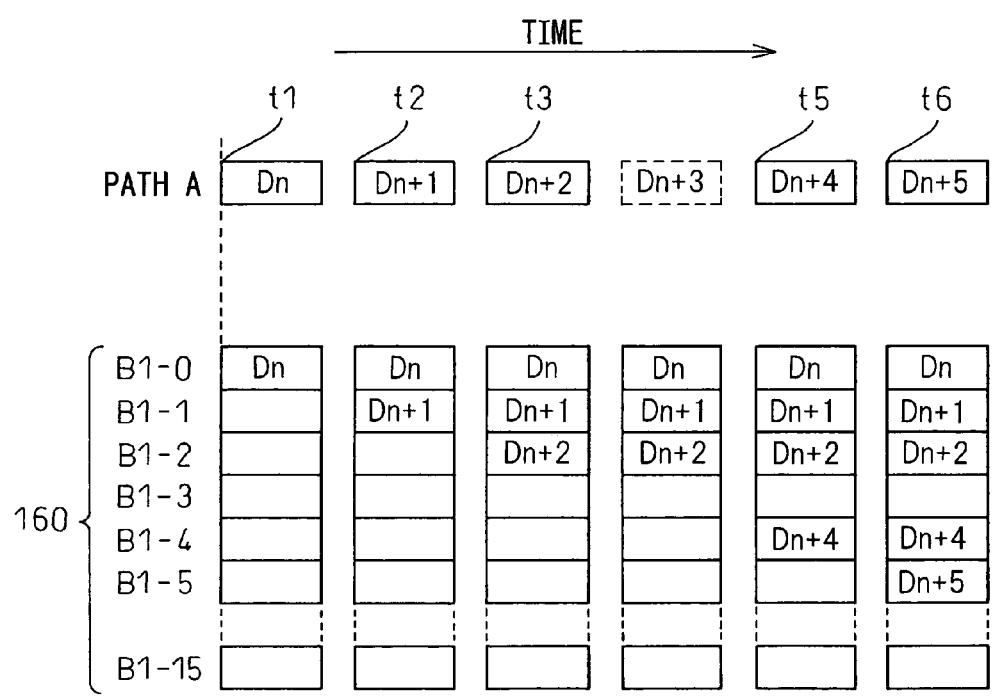
FIG. 13 is a diagram showing a procedure for storing received frames when a missing frame has occurred.

FIG. 13 is a diagram showing how the received frames are stored when a missing frame has occurred. By assigning a buffer storage location to each received frame in accordance with its frame number, it becomes possible to uniquely determine the storage location of the frame in accordance with its frame number even when some other frame is lost during transmission.

In the example shown in FIG. 13, the frame Dn+3 is missing; in this case, the buffer B1-3 is left empty, and the subsequent frames Dn+4 and Dn+5 are stored at the buffer locations B1-4 and B-5, respectively, in the same manner as when the preceding frame was not lost.

As a result, when comparing the frames of the same content received via different paths, the frame comparing section 154 can easily locate the positions in the buffer at which the same frames received from different base stations are stored; this serves to simplify the procedure and structure for reading the frames from the memory 150.

For example, when the frame with the frame number 5 is received via the path A, the frame is always stored at the location B1-5, and the same frame received via the path B is always stored at the location B2-5. As the relation between the buffer storage locations where the frames with the same frame number received via different paths are stored are fixed for each frame number, the frame comparing section 154 can easily read out the frames.

Turning back to FIG. 10, a description will be given of how the frame is stored when it is determined in step S13 that the buffer for buffering the frames received from the mobile terminal MT is expanded.

Figure 14:
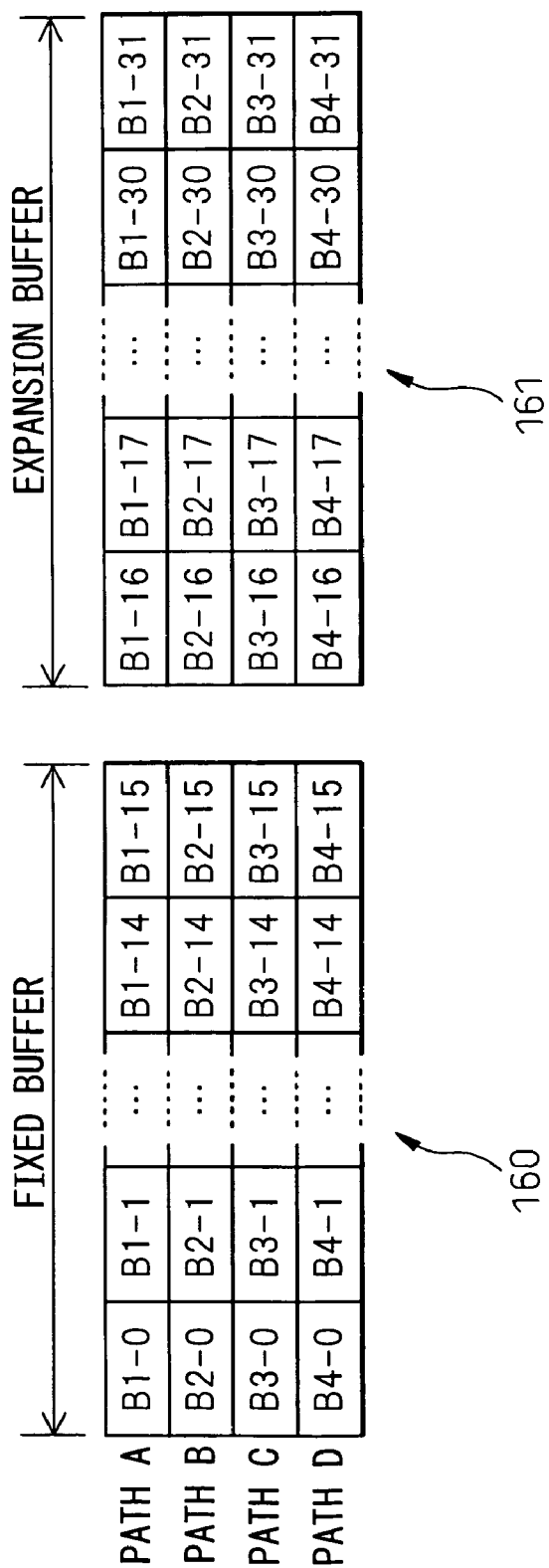
FIG. 14 is a diagram showing an example of the buffer configuration when an expansion buffer is added to the fixed buffer.

The buffer for buffering the received frames is expanded by adding an expansion buffer 161, provided in a prescribed area within the memory 151 shown in FIG. 9, to the fixed buffer 160 by the buffer expansion operation performed by the buffer control section 152 as will be described later. FIG. 14 shows an example of the buffer configuration when the expansion buffer is added to the fixed buffer.

In the example shown, the buffer areas in the fixed buffer 160 assigned for each mobile terminal MT are each supplemented by a storage area of the same size that can buffer additional 16 frames received via each of the four paths A to D.

As a result, in the illustrated example, the buffer is expanded so that 32 frames received via the path A from the mobile terminal MT connected to the radio network controller 100 can be stored in order of frame number at the 32 storage locations B1-0 to B1-31, that 32 frames received via the path B from the mobile terminal MT can be stored in order of frame number at the 32 storage locations B2-0 to B2-31, that 32 frames received via the path C can be stored in order of frame number at the 32 storage locations B3-0 to B3-31, and that 32 frames received via the path D can be stored in order of frame number at the 32 storage locations B4-0 to B4-31.

Here, in the case where the buffer storage location for each received frame is determined in accordance with the low-order bits of its frame number as described above, it is preferable to expand the buffer to a multiple (a multiple of 2) of the usual buffer length, even when the buffering period for buffering the frames need not be extended that much. In the example of FIG. 14, the buffer length of the expansion buffer 161 is the same as that of the fixed buffer 160, that is, the buffer length is doubled by expansion.

When the expanded buffer length is made equal to a multiple (a multiple of 2) of the usual buffer length as described above, then by just increasing the number of low-order bits of the frame number used to determine the frame storage location, the storage location for each frame within the buffer can be determined in accordance with the low-order bits of its frame number even after the buffer expansion.

Figure 15:
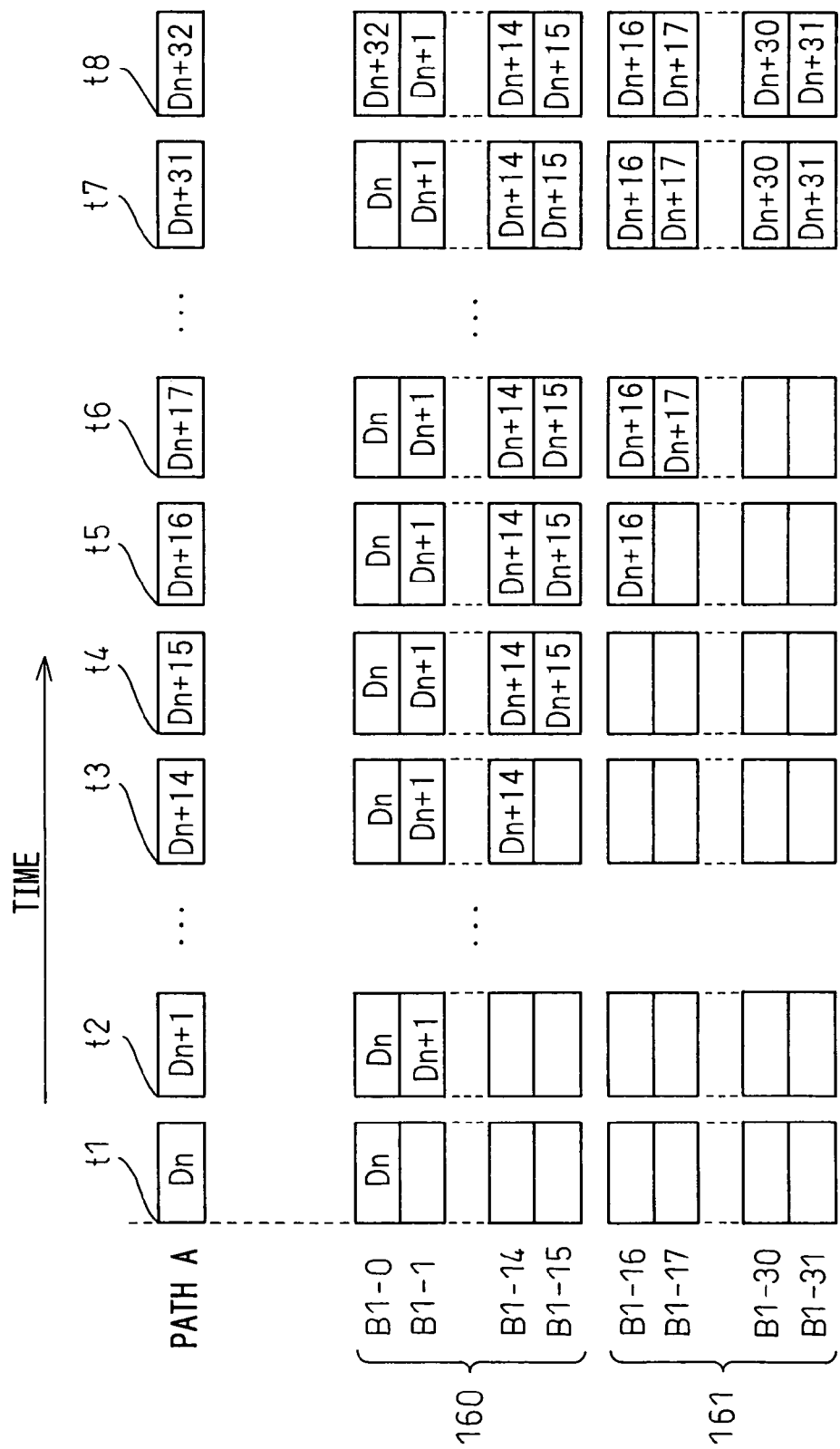
FIG. 15 is a diagram for explaining a procedure for storing received frames in the expansion buffer.

FIG. 15 is a diagram for explaining how the received frames are stored in the expansion buffer 161. The illustrated example shows the case where the frames are received from one of the paths 1 to n, i.e., the path A which is assigned the buffer locations B1-0 to B1-15 in the fixed buffer 160, and where expansion buffer locations B1-16 to B1-31 are provided in addition to the fixed buffer locations B1-0 to B1-15.

As the frames Dn, Dn+1, . . . , Dn+14, and Dn+15 are received at times t1, t2, . . . , t3, and t4, respectively, the frames are stored at the respective fixed buffer locations B1-0 to B1-15 in sequence.

As the subsequent frames Dn+16, Dn+17, . . . , and Dn+31 are received at times t5, t6, . . . , and t7, respectively, the frames are stored at the respective expansion buffer locations B1-16 to B1-31 in sequence.

When the 33rd frame is received at time t8, since the 32 storage locations provided in the fixed buffer 160 and expansion buffer 161 are already used up, the storage location of this frame Dn+32 goes back to the starting location B1-0.

In step S13 of FIG. 10, the buffer assigning section 153 in the selection combining section 150 determines whether the buffer is expanded or not. Here, the buffer assigning section 153 checks the presence or absence of the expansion buffer by referring to a control flag in a control flag table 163 stored in a prescribed storage area within the memory 151.

FIG. 16 is a diagram showing an example of the data structure of the control flag table 163. The control flag table 163 stores the terminal identification number of each mobile terminal MT connected to the radio network controller 100 by associating with it the following control flags.

The control flags include: a flag ExV which is set to "1" or "0" to indicate whether the buffer expansion for frame receiving is needed or not needed for the mobile terminal MT; a flag ExDV which is set to "1" or "0" to indicate whether any valid frame is stored or not stored in the expansion buffer 161; and an address ExAdr within the memory 151, which indicates the beginning of the assigned expansion buffer 161. In this way, by managing the need or lack of need for buffer expansion and the address of the expansion buffer for each mobile terminal MT, the fixed buffer 160 can be expanded for each mobile terminal MT.

In step S13, when the flag ExV stored by being associated with the identification number of the terminal that originated the received frame is set to "1" (that is, buffer expansion is needed), or when the flag ExDV is "1" (a valid frame is stored in the expansion buffer 161), the buffer assigning section 153 determines that the buffer is expanded.

In step S15, the buffer assigning section 153 determines whether the received frame is to be stored in the fixed buffer 160 or in the expansion buffer 161 by checking the value of the fifth lowest order bit of the frame number of the received frame.

That is, as the frame storage location in the fixed buffer 160 as well as in the expansion buffer 161 is determined by the low-order four bits of the frame number, the determination as to whether the frame is to be stored in the fixed buffer 160 or in the expansion buffer 161 is made based on the value of the fifth lowest order bit which is one bit higher than the low-order four-bit part.

When the buffer is not expanded yet, any received frame is stored in the fixed buffer 160, whether the fifth lowest order bit of its frame number be "1" or "0". Accordingly, in order that the storing order of the frames stored at the respective fixed buffer locations B1-0 to B1-15 immediately before the buffer expansion is made consistent with the storing order of the frames to be stored at the respective buffer locations B1-0 to B1-31 after the buffer expansion, the buffer assigning section 153 determines in which buffer, the fixed buffer 160 (B1-0 to B1-15) or the expansion buffer 161 (B1-16 to B1-31), each frame received after the expansion is to be stored by referring to the value of the fifth lowest order bit of the frame number of any of the frames stored at the fixed buffer locations B1-0 to B1-15 at the time of the buffer expansion.

Figure 17A:
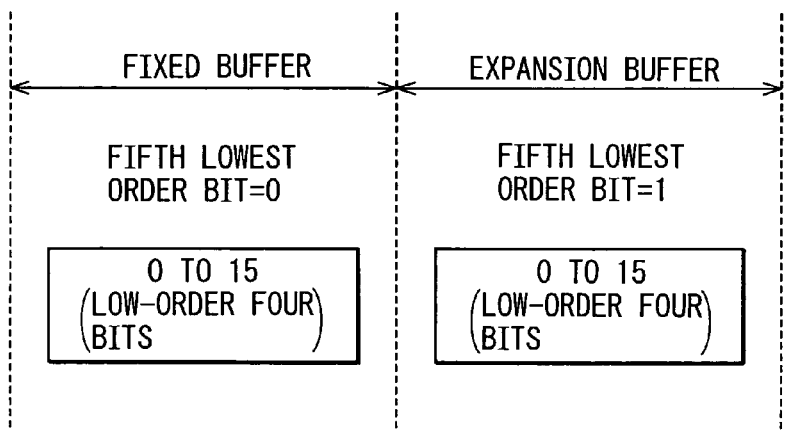
FIG. 17A and FIG. 17B are diagrams for explaining how a determination is made as to in which buffer, the fixed buffer or the expansion buffer, each received frame is to be stored.
Figure 17B:
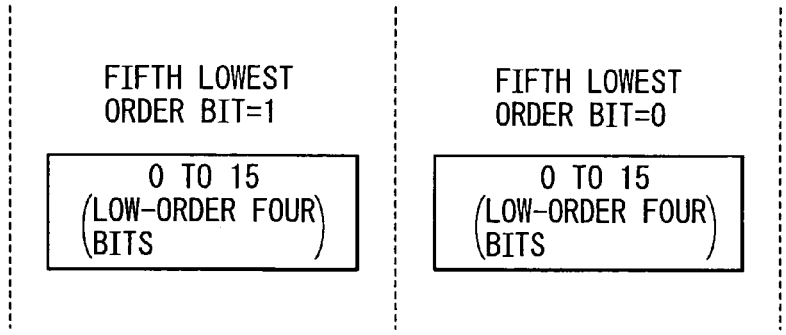

More specifically, as shown in FIGS. 17A and 17B, when the value of the fifth lowest order bit of the frame number of the frame received after the expansion is the same as that of the frame held in the fixed buffer 160 at the time of the buffer expansion, the buffer assigning section 153 stores the frame received after the expansion in the fixed buffer 160, but when they differ, the received frame is stored in the expansion buffer 161.

FIG. 17A shows the case where the fifth lowest order bit of the frame held in the fixed buffer 160 at the time of the buffer expansion is "0", and FIG. 17B shows the case where the fifth lowest order bit of the frame stored in the fixed buffer 160 at the time of the buffer expansion is "1".

The buffer assigning section 153 refers to a flag FrNH in the control flag table 163 when determining in which buffer, the fixed buffer 160 or the expansion buffer 161, the received frame is to be stored.

As will be described later, when expanding the buffer, the flag FrNH is determined based on the value of the fifth lowest order bit of the frame number of the frame held in the fixed buffer 160 at that time. For example, when the value of the fifth lowest order bit of the frame number is "0", FrNH is set to "1", which indicates that the received frame should be stored in the expansion buffer 161 if its frame number has a value "1" at its fifth lowest order position.

Conversely, when the value of the fifth lowest order bit of the frame number held in the fixed buffer 160 at the time of the buffer expansion is "1", FrNH is set to "0", which indicates that the received frame should be stored in the expansion buffer 161 if its frame number has a value "0" at its fifth lowest order position.

Then, if the buffer assigning section 153 determines in step S15 that the frame is to be stored in the fixed buffer 160, the process proceeds to step S16, and the buffer assigning section 153 stores the frame in the fixed buffer 160; on the other hand, if it is determined that the frame is to be stored in the expansion buffer 161, the process proceeds to step S17, and the buffer assigning section 153 stores the frame in the expansion buffer 161. At this time, the buffer assigning section 153 sets the value of the flag ExDV in the control flag table 163 to "1" which indicates that a valid frame is stored in the expansion buffer 161 (step S18).

Figure 18:
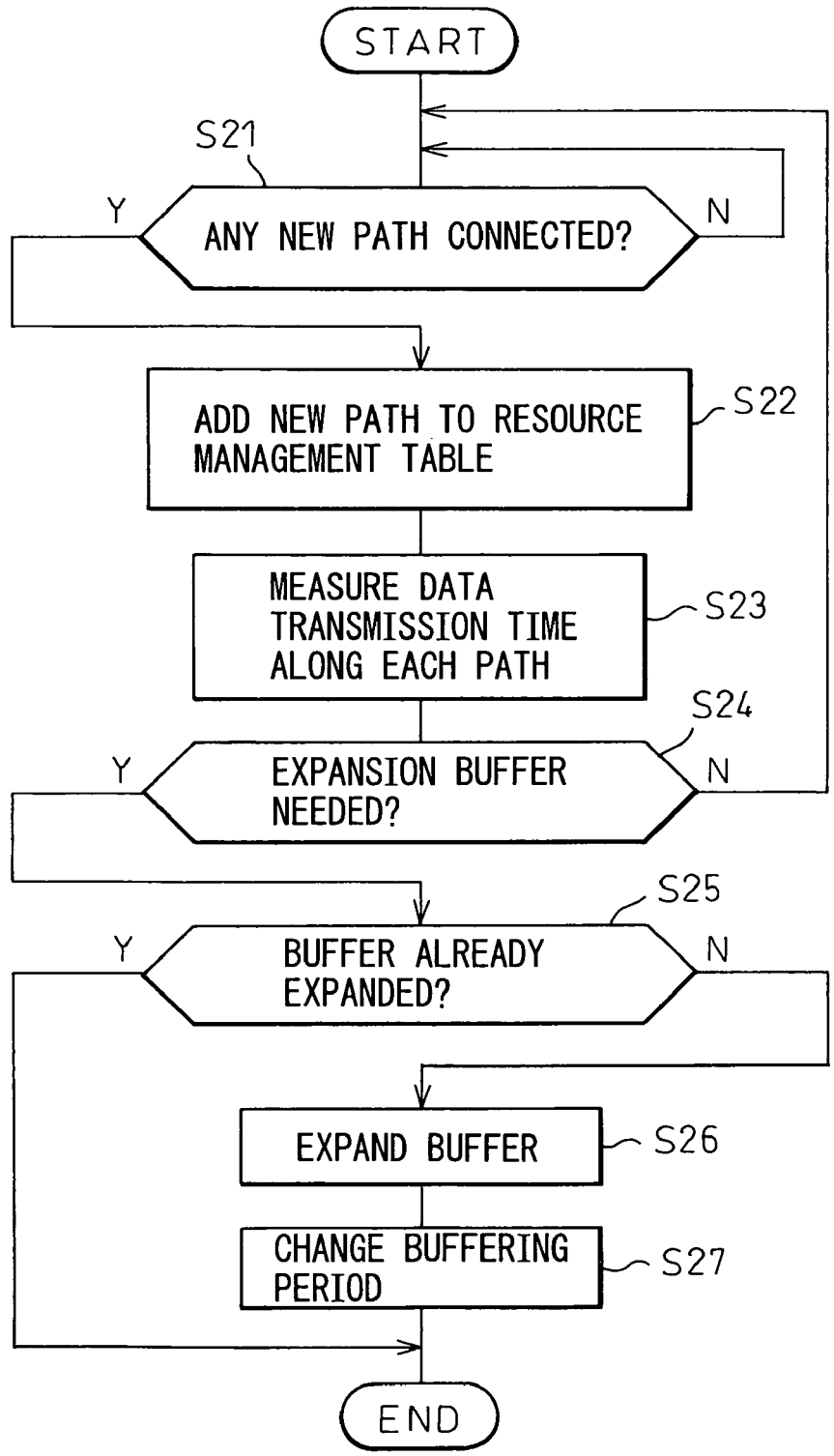
FIG. 18 is a flowchart illustrating a buffer expansion procedure.

Next, a procedure for buffer expansion will be described with reference to FIG. 18. FIG. 18 is a flowchart illustrating the buffer expansion procedure.

In step S21, the connection control section 132 in the radio network controller 100 shown in FIG. 5 determines whether any new base station is connected to the currently connected mobile terminal MT, that is, whether any new path is added to the existing connection with the mobile terminal MT.

If there is any new path, in step S22 the connection control section 132 establishes a connection with the mobile terminal MT via the new path, and the data identification number appended to each frame received via this path is stored in the resource management table 142 maintained in the diversity handover control section 140.

If a change has occurred in the resource management table 142, in step S23 the timing control section 144 measures the data transmission time along each of the paths whose data identification numbers are stored in association with the terminal identification number for which the record has been updated in accordance with the change.

Then, in step S24, if the maximum value of the differences between the data transmission times along the currently connected paths is larger than the value of the buffering period corresponding to the buffer length (16 frames) of the fixed buffer 160, the buffer control section 152 in the selection combining section 150 shown in FIG. 9 determines that the expansion buffer 161 is needed, and the process proceeds to step S25.

In step S25, the buffer control section 152 refers to the control flag table 163 to see if the expansion buffer 161 is already added to the fixed buffer 160. If the flag ExV is "1", or if the flag ExDV is "1", the buffer control section 152 determines that the buffer is already expanded; otherwise, it is determined that the buffer is not expanded yet.

Here, if the flag ExV is "0", but the flag ExDV is "1", this means that the buffer is already expanded, and there is no need to newly secure an expansion buffer, but the flag ExV is set to "1" to indicate that the expansion buffer is needed.

If it is determined in step S25 that the buffer is not expanded yet, the buffer control section 152 performs the buffer expansion operation in step S26.

First, the buffer control section 152 secures a storage area for the expansion buffer 161 within the memory 151, and stores its starting address in ExAdr in the control flag table 163. Then, the buffer control section 152 sets the flag ExV in the control flag table 163 to "1" to indicate that the expansion buffer is needed, and sets the value of the flag FrNH in accordance with the fifth lowest order bit of the frame number of the frame held in the fixed buffer 160 at that time or of the frame received at that time.

In the next step S27, the buffer control section 152 changes the buffering period stored in the buffering period table 143 for the mobile terminal MT to the buffering period corresponding to the number of frames that the expanded buffer, i.e., the fixed buffer 160 and the expansion buffer 161, can buffer.

Figure 19:
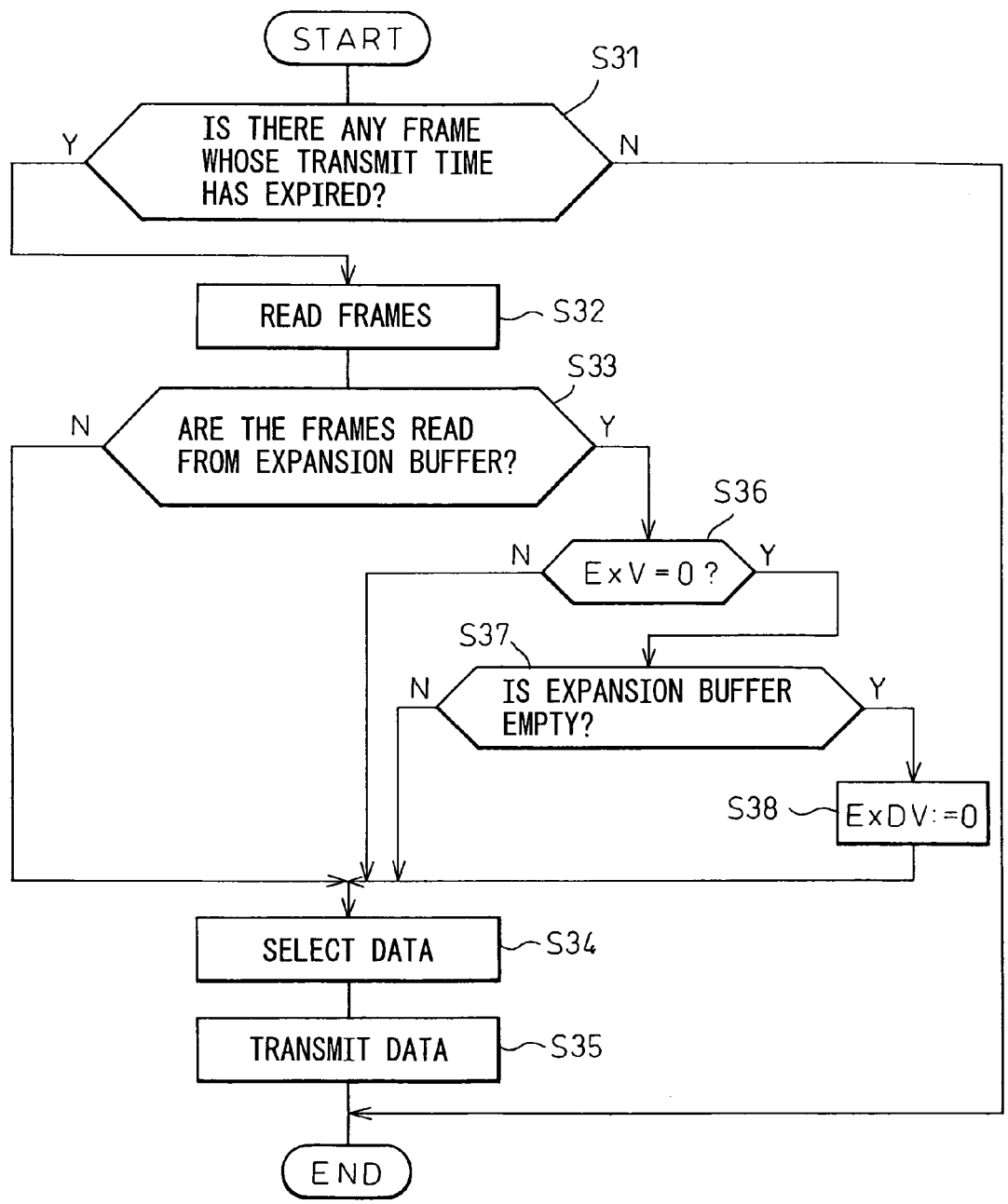
FIG. 19 is a flowchart illustrating a frame transmission procedure.

Next, a procedure for transmitting the frames from the buffer will be described with reference to FIG. 19. FIG. 19 is a flowchart illustrating the frame transmission procedure.

In step S31, the frame comparing section 154 determines for each mobile terminal whether there is any frame whose scheduled transmit time has expired among the frames stored in the buffer.

At this time, as previously described, the frame comparing section 154 estimates the time at which each frame was received by the radio network controller 100, based on the frame number of the frame stored in the buffer and the data transmission time stored in the resource management table 142. Then, the frame comparing section 154 reads the buffering period stored for the mobile terminal from the buffering period table 143, and extracts any frame already received at a time earlier than the current time by the buffering period.

Then, in step S32, the frame comparing section 154 reads the buffer to retrieve the extracted frame and all the frames having the same content as the extracted frame and received via other paths. As the storage location of each frame in the buffer is determined by its frame number, the frame comparing section 154 can easily retrieve the frames having the same content as the extracted frame, that is, the frames having the same frame number.

In step S33, the frame comparing section 154 determines from which buffer, the fixed buffer 160 or the expansion buffer 161, the frames have been read out. If the frames have been read out from the fixed buffer 160, the frame comparing section 154 selects in step S34 the highest quality frame among the readout frames and, in step S35, transmits the selected frame to the fixed communication network N.

If it is determined in step S33 that the frames have been read out from the expansion buffer 161, then the frame comparing section 154 determines in step S36 whether the difference between the data transmission times along the currently connected paths is small enough that it can be accommodated by the fixed buffer 160, eliminating the need for the expansion buffer 161. At this time, the frame comparing section 154 determines whether the expansion buffer is needed or not needed, for example, by referring to the flag ExV stored in the control flag table 163.

If it is determined in step S36 that the expansion buffer is needed, the process proceeds to step S34 where the frame comparing section 154 selects the highest quality frame among the readout frames, and in step S35, the selected frame is transmitted to the fixed communication network N.

The procedure for changing the set value of the flag ExV when the expansion buffer 161 is not needed will be described later in connection with an expansion buffer deletion procedure.

If it is determined in step S36 that the expansion buffer 161 is not needed, the frame comparing section 154 determines in step S37 whether any valid frame is stored in the expansion buffer 161. The frame comparing section 154 determines that no valid frame is stored in the expansion buffer 161, for example, when the buffering period stored in the buffering period table 143 for the mobile terminal is already shortened to its original length, i.e., the buffering period before the expansion, and when the storage location from which the frame was read in step S32 was at the endmost position of the expansion buffer 161.

If it is determined in step S37 that a valid frame is stored in the expansion buffer 161, the frame comparing section 154 selects in step S34 the highest quality frame among the readout frames and, in step S35, transmits the selected frame to the fixed communication network N.

On the other hand, if it is determined in step S37 that no valid frame is stored in the expansion buffer 161, the frame comparing section 154 in step S38 sets the flag ExDV in the control flag table 163 to "0" to indicate that no valid frame is stored in the expansion buffer 161. Then, the process proceeds to step S34 where the highest quality frame is selected from among the readout frames, and in step S35, the selected frame is transmitted to the fixed communication network N.

Figure 20:
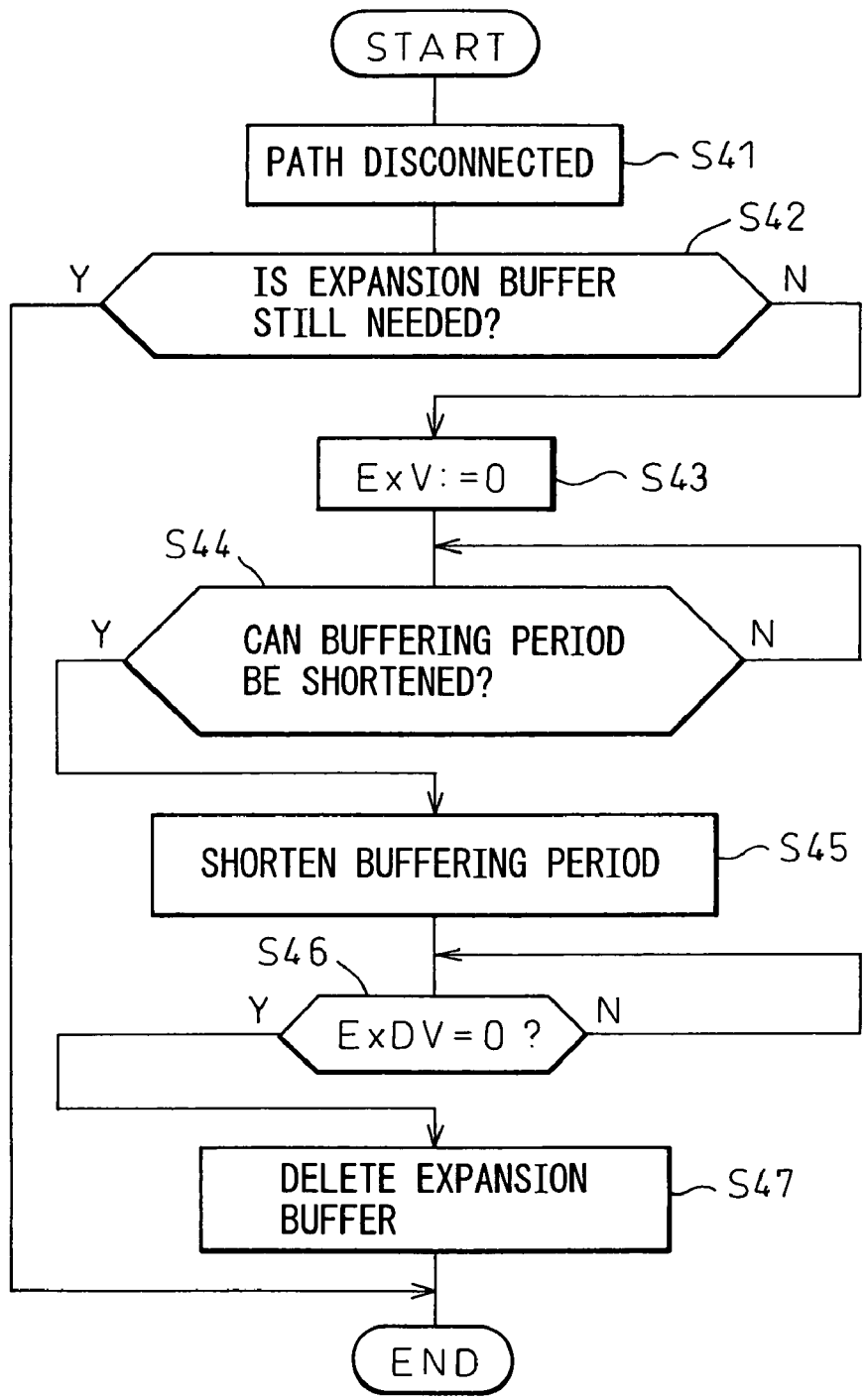
FIG. 20 is a flowchart illustrating an expansion buffer deletion procedure.

Next, the procedure for deleting the expansion buffer 161 will be described with reference to FIG. 20. FIG. 20 is a flowchart illustrating the expansion buffer deletion procedure.

When any one of the paths connecting between the radio network controller 100 and the mobile terminal MT is disconnected in step S41, the connection control section 132 shown in FIG. 5 deletes the data identification number of the disconnected path and its associated data transmission time from the resource management table 142.

When the path is deleted from the resource management table 142, the buffer control section 152 shown in FIG. 9 determines in step S42 whether the expansion buffer 161 is still needed in order to receive frames from the mobile terminal MT that was using the path just disconnected. At this time, if the maximum value of the differences between the data transmission times along the currently connected paths is larger than the value of the buffering period corresponding to the buffer length of the fixed buffer 160, the buffer control section 152 determines that the expansion buffer 161 is still needed.

On the other hand, if it is determined that the expansion buffer 161 is no longer needed, the buffer control section 152 in step S43 sets the value of the flag ExV in the control flag table 163 to "0" to indicate that the expansion buffer 161 is not needed.

When the expansion buffer 161 is added to the fixed buffer 160, the buffering period is extended in step S27 in FIG. 18 to match the expanded buffer length; accordingly, there is a spacing equivalent to the expanded buffer length between the frame currently being stored in the buffer and the frame read out of the buffer for transmission, and at this stage, the expansion buffer 161 contains valid frames. An example for explaining this situation is shown in FIG. 21.

The illustrated example shows the case where the frames are received from one of the paths 1 to n, i.e., the path A which is assigned the buffer locations B1-0 to B1-15 in the fixed buffer 160 and the buffer locations B1-16 to B1-31 in the expansion buffer 161, as in the case of FIG. 15.

As shown at time t1 in FIG. 21, there is a spacing equivalent to the sum of the fixed buffer 160 and the expansion buffer 161, i.e., 32 frames, between the frame (Dn+42) currently being received from the path A and the frame (Dn+10) read out of the buffer for transmission. Here, as a new frame is stored in the expansion buffer 161 before the expansion buffer 161 empties, the expansion buffer 161 cannot be deleted if the process has to wait until the expansion buffer 161 becomes empty.

Therefore, preparatory to the deletion of the expansion buffer 161, the buffer control section 152 shortens the buffering period for buffering the frames received from the mobile terminal MT back to the shorter buffering period, i.e., the original buffering period before the expansion. For this purpose, the buffer control section 152 determines in step S44 in FIG. 20 whether the buffer period can be shortened or not.

For example, when the received frames are audio data, the data requires real time transmission, but no appreciable problem occurs if the frames are discarded momentarily. Therefore, the convention is used here that when the received frames are audio data, the determination in step S44 is always affirmative; then, as shown in FIG. 21, when the expansion buffer 161 is rendered no longer needed at time t2, the buffer control section 152 shortens the buffering period to match the buffer length (16 frames) of the fixed buffer 160, and updates the buffering period table 143 accordingly (S45).

As a result of the shortening of the buffering period, the transmit time for the frames Dn+11 to Dn+27 arrives at time t2; therefore, at this time, the frame comparing section 154 transmits only the recent frame Dn+27 and discards the other frames Dn+11 to Dn+26 stored at the buffer locations B1-11 to B1-26.

On the other hand, when the received frames are packet data, the frames do not always contain valid data. Therefore, in step S44, the buffer control section 152 waits until empty frames corresponding the buffering period are to be shortened, and shortens the buffering period when the scheduled transmit time for the starting frame in the empty frame sequence has arrived. FIG. 22 is a diagram for explaining the procedure for shortening the buffering period when the received frames are packet data.

In this example also, there is a spacing, equivalent to 32 frames, between the frame (Dn+42) being received at time t1 and the frame (Dn+10) read out of the buffer for transmission.

Here, at time t2, the expansion buffer is considered to be no longer needed, and the buffer control section 152 determines whether the buffering period can be shortened or not, by checking whether the 16 frames led by the frame Dn+11 for which the scheduled transmit time has arrived are empty data frames.

In this example, the frame Dn+11 for which the scheduled transmit time has arrived is not an empty data frame and, therefore, cannot be discarded.

From time t2 to t3, the frames Dn+12 to Dn+17 are sequentially transmitted. It is assumed that, at time t4, the 16 frames Dn+18 to Dn+33 led by the frame Dn+18 for which the scheduled transmit time has arrived at this time are empty data frames. Then, at time t4, the buffer control section 152 shortens the buffering period to the period that matches the buffer length of the fixed buffer 160, and updates the buffering period table 143 accordingly.

As a result of the shortening of the buffering period, the transmit time for the frames Dn+18 to Dn+34 arrives at time t4; therefore, at this time, the frame comparing section 154 transmits only the recent frame Dn+34 and discards the other frames Dn+18 to Dn+33 stored at the buffer locations B1-18 to B1-33. (The frames Dn+18 to Dn+34 which are empty data frames can be discarded without causing any problems.) Turning back to FIG. 20, in the subsequent step S46, the buffer control section 152 waits until the frame comparing section 154 sequentially reads out the frames from the expansion buffer and sets the flag ExDV to "0" to indicate that the expansion buffer 161 is empty (time t3 in FIG. 21 and time t5 in FIG. 22), and in step S47, the buffer control section 152 deletes the expansion buffer 161 by freeing the storage area secured for the expansion buffer.

In the above embodiment, as shown in FIG. 14 and FIGS. 17A and 17B, the buffer length (number of frames) of the fixed buffer 160 has been set to 16, i.e., a multiple of 2, and the buffer length of the expansion buffer 161 has been set equal to that of the fixed buffer 160.

Then, each frame storage location in the buffers 160 and 161 has been determined in accordance with the low-order bit sequence occupied by an integer 0 to (buffer length−1) in the bit sequence representing the frame number in binary code, and the determination as to in which of the buffers 160 and 161 each frame is to be stored has been made based on the value of the bit one-bit higher than the low-order bit sequence in the bit sequence representing the frame number in binary code.

Figure 23A:
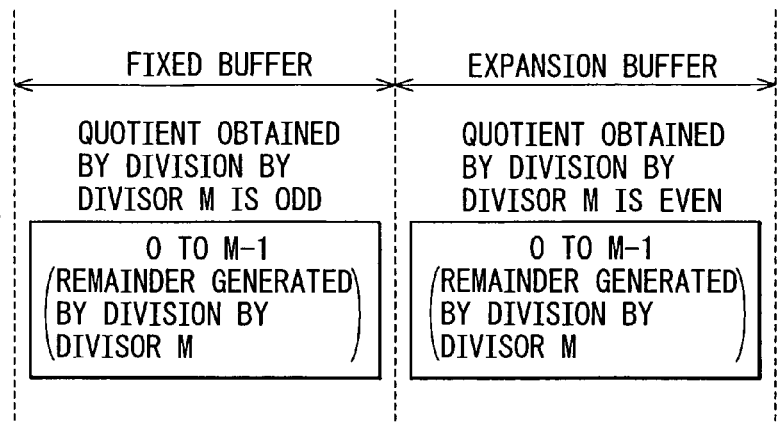
FIG. 23A and FIG. 23B are diagrams showing an alternative configuration example of the fixed buffer and expansion buffer.
Figure 23B:
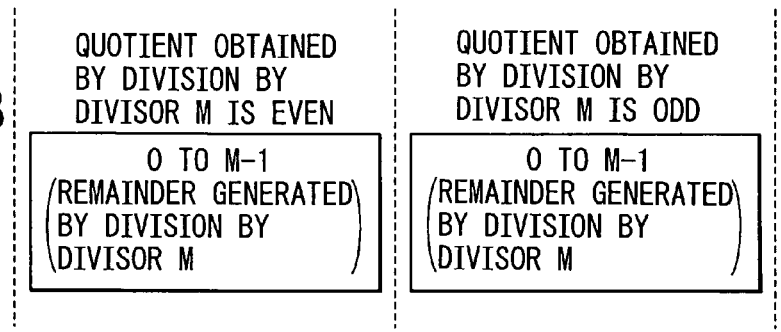

However, the present invention is applicable not only to the case where the buffer length of each of the buffers 160 and 161 is set to a multiple of 2, but also to the case where the buffer length is set to some other suitable value M. FIGS. 23A and 23B show an alternative configuration example of the fixed buffer and expansion buffer.

In the configuration example shown in FIGS. 23A and 23B, the buffer length of each of the fixed buffer 160 and expansion buffer 161 is set equal to M frames.

The buffer assigning section 153 shown in FIG. 9 determines each frame storage location in accordance with the remainder generated when the frame number is divided by the divisor M, and determines in which buffer, the fixed buffer 160 or the expansion buffer 161, each received frame is to be stored, based on the quotient obtained by dividing the frame number by the divisor M. In the example shown here, the determination as to in which buffer, the fixed buffer 160 or the expansion buffer 161, the received frame is to be stored is made based on whether the quotient obtained by dividing the frame number by the divisor M is odd or even.

In this case, the buffer control section 152 stores in the control flag table 163 the result of the determination as to whether the quotient is odd or even when the frame number of the frame held in the fixed buffer 160 at the time of the buffer expansion is divided by the divisor M.

If the quotient is odd when the frame number of the frame held in the fixed buffer 160 at the time of the buffer expansion is divided by M, then as shown in FIG. 23A the buffer assigning section 153 stores the received frame in the fixed buffer 160 if the quotient obtained by dividing the frame number of the received frame by M is odd, but stores it in the expansion buffer 161 if the quotient is even.

On the other hand, if the quotient is even when the frame number of the frame held in the fixed buffer 160 at the time of buffer expansion is divided by M then, as shown in FIG. 23B, the buffer assigning section 153 stores the received frame in the fixed buffer 160 if the quotient obtained by dividing the frame number of the received frame by M is even, but stores it in the expansion buffer 161 if the quotient is odd.

According to the present invention, when a mobile terminal moving between adjacent areas becomes able to communicate with a base station serving another area to which the mobile terminal is not intended to be handed over, the communication between the mobile terminal and the radio network controller can be maintained through such a base station.

The present invention can be applied to a radio network controller for controlling a plurality of base stations communicating with a mobile terminal via radio in a mobile communication network, and also to a method for handover that is performed when a mobile terminal moves between areas served by different base stations; in particular, the invention can be used advantageously for implementing a network controller to be used in a mobile communication network capable of accommodating third generation mobile telephones such as W-CDMA the technical specifications for which are defined by the 3GPP, and also for implementing a method for handover of a mobile terminal in such a network.

While the invention has been described with reference to specific embodiments chosen for purpose of illustration, it should be apparent that numerous modifications could be made thereto by those skilled in the art without departing from the basic concept and scope of the invention.

The invention claimed is:

1. A radio network controller (100) for controlling a plurality of base stations (BS1, BS2, BSX) communicating with a mobile terminal (MT) via radio, wherein said radio network controller (100) selects a frame to be transmitted to a fixed network (N) from among frames having same content which is received from the same mobile terminal (MT) via different base stations (BS1, BS2, BSX), said radio network controller (100) comprising:

a buffer (160) which buffers said frames respectively received from said different base stations (BS1, BS2, BSX) and has a predetermined capacity determined in accordance with a predetermined data transmission time difference;

a transmission time difference detecting section (144) which detects a data transmission time difference as a difference between data transmission times of different paths from the different base stations (BS1, BSX) to said radio network controller (100);

a buffer control section (152) which expands the capacity of said buffer (160) when said transmission time difference between a new base station (BSX) commencing communication with said same mobile terminal (MT) and another base station (BS1) already communicating with said same mobile terminal (MT) is larger than said predetermined data transmission time difference; and a buffer assigning section (153) which assigns storage locations in said buffer (160, 161) to said received frames, and wherein said storage locations in said buffer (160, 161) to be assigned to said frames are each determined in accordance with a remainder that is generated when a frame number is divided by a given divisor, wherein the frame number appended to each of said received frames indicates a transmission order of the received frames.

2. The radio network controller (100) as claimed in claim 1, wherein said predetermined data transmission time represents a length of time that is set equal to or shorter than the time required to receive the same number of frames as the number of frames that said buffer (160) before expansion is capable of simultaneously buffering from among the frames arriving via the same base station (BS1, BS2, BSX).

3. The radio network controller (100) as claimed in claim 1, wherein said divisor represents the number of bufferable frames that is assigned to the frames arriving via one base station (BS1, BS2, BSX).

4. The radio network controller (100) as claimed in claim 1, wherein said buffer (160, 161) includes a fixed buffer (160) having a predetermined buffer length and an expansion buffer (161) which is added to said fixed buffer (161) for expansion, and wherein
said buffer assigning section (153) determines in which buffer, said fixed buffer (160) or said expansion buffer (161), each frame received after said buffer expansion is to be stored, by referring to a quotient that is obtained when the frame number of any of said frames held in said fixed buffer (160) at the time of said buffer expansion is divided by said given divisor.

5. The radio network controller (100) as claimed in claim 4, wherein
if the quotient is odd when the frame number of said frame held in said fixed buffer (160) at the time of said buffer expansion is divided by said given divisor, then said buffer assigning section (153) stores the frame received after said buffer expansion in said fixed buffer (160) if the quotient obtained by dividing the frame number of said received frame by said given divisor is odd, but stores said received frame in said expansion buffer (161) if said quotient is even, and
if the quotient is even when the frame number of said frame held in said fixed buffer (160) at the time of said buffer expansion is divided by said given divisor, then said buffer assigning section (153) stores the frame received after said buffer expansion in said fixed buffer (160) if the quotient obtained by dividing the frame number of said received frame by said given divisor is even, but stores said received frame in said expansion buffer (161) if said quotient is odd.

6. The radio network controller (100) as claimed in claim 4, wherein said divisor represents the number of bufferable frames that is assigned to the frames arriving via one base station (BS1, BS2, BSX).

7. The radio network controller (100) as claimed in claim 1, further comprising a buffer assigning section (153) which assigns storage locations in said buffer (160, 161) to said received frames, and wherein
said storage locations in said buffer (160, 161) to be assigned to said frames are each determined in accordance with a prescribed low-order bit sequence in a bit sequence representing a frame number which indicates a transmission order of said received frames.

8. The radio network controller (100) as claimed in claim 7, wherein said buffer (160, 161) includes a fixed buffer (160) having a predetermined buffer length and an expansion buffer (161) which is added to said fixed buffer (161) for expansion, and wherein
when the value of a bit one bit higher than said low-order-bit sequence in the bit sequence representing the frame number of a frame received after said buffer expansion is equal to the value of a bit one bit higher than said low-order-bit sequence in the bit sequence representing the frame number of any of said frames held in said fixed buffer (160) at the time of said buffer expansion, said buffer assigning section (153) stores said frame received after said buffer expansion in said fixed buffer (160), but when the values of said one-bit-higher bits do not match, said buffer assigning section (153) stores said frame received after said buffer expansion in said expansion buffer (161).

9. A method for handover of a mobile terminal (MT), wherein a radio network controller (100) for controlling a plurality of different base stations (BS1, BS2, BSX) receives frames having same content from the same mobile terminal (MT) from said different base stations (BS1, BS2, BSX), selects one of said received frames, and transmits said selected frame to a fixed network (N), and wherein
said frames received by said radio network controller (100) via said different base station (BS1, BS2, BSX) are buffered in a buffer (160) which has a predetermined capacity determined in accordance with a predetermined data transmission time difference,
a data transmission time difference between said different base stations as a difference between data transmission times of different paths from the different base stations (BS1, BSX) to said radio network controller (100) is detected, and
said capacity of said buffer (160) is expanded when said transmission time difference between a new base station (BSX) commencing communication with said mobile terminal (MT) and another base station (BS1) already communicating with said mobile terminal (MT) is larger than said predetermined data transmission time difference, and
storage locations in said buffer (160, 161) to be assigned to said frames are each determined in accordance with a remainder that is generated when a frame number is divided by a given divisor, wherein the frame number appended to each of said received frames indicates a transmission order of the received frames.

10. The method for handover as claimed in claim 9, wherein said predetermined data transmission time represents a length of time that is set equal to or shorter than the time required to receive the same number of frames as the number of frames that said buffer (160) before expansion is capable of simultaneously buffering from among the frames arriving via the same base station (BS1, BS2, BSX).

11. The method for handover as claimed in claim 9, wherein said divisor represents the number of bufferable frames that is assigned to the frames arriving via one base station (BS1, BS2, BSX).

12. The method for handover as claimed in claim 9, wherein said buffer (160) is expanded by adding an expansion buffer (161) to a fixed buffer (160) having a predetermined buffer length, and wherein
a determination as to in which buffer, said fixed buffer (160) or said expansion buffer (161), each frame received after said buffer expansion is to be stored is made by referring to a quotient that is obtained when the frame number of any of said frames held in said fixed buffer (160) at the time of said buffer expansion is divided by said given divisor.

13. The method for handover as claimed in claim 12, wherein
if the quotient is odd when the frame number of said frame held in said fixed buffer (160) at the time of said buffer expansion is divided by said given divisor, then the frame received after said buffer expansion is stored in said fixed buffer (160) if the quotient obtained by dividing the frame number of said received frame by said given divisor is odd but, if said quotient is even, said received frame is stored in said expansion buffer (161), and if the quotient is even when the frame number of said frame held in said fixed buffer (160) at the time of said buffer expansion is divided by said given divisor, then the frame received after said buffer expansion is stored in said fixed buffer (160) if the quotient obtained by dividing the frame number of said received frame by said given divisor is even but, if said quotient is odd, said received frame is stored in said expansion buffer (161).

14. The method for handover as claimed in claim 12, wherein said divisor represents the number of bufferable frames that is assigned to the frames arriving via one base station (BS1, BS2, BSX).

15. The method for handover as claimed in claim 9, wherein storage locations in said buffer (160, 161) to be assigned to said frames are each determined in accordance with a prescribed low-order bit sequence in a bit sequence representing a frame number which indicates a transmission order of said received frames.

16. The method for handover as claimed in claim 15, wherein said buffer (160) is expanded by adding an expansion buffer (161) to a fixed buffer (160) having a predetermined buffer length, and wherein when the value of a bit one-bit higher than said low-order bit sequence in the bit sequence representing the frame number of a frame received after said buffer expansion is equal to the value of a bit one-bit higher than said low-order bit sequence in the bit sequence representing the frame number of any of said frames held in said fixed buffer (160) at the time of said buffer expansion, said frame received after said buffer expansion is stored in said fixed buffer (160), but when the values of said one-bit higher bits do not match, said frame received after said buffer expansion is stored in said expansion buffer (161).

* * * * *